US011230209B2

(12) United States Patent
Nonaka

(10) Patent No.: US 11,230,209 B2
(45) Date of Patent: Jan. 25, 2022

(54) ARMREST DEVICE

(71) Applicant: TS TECH CO., LTD., Asaka (JP)

(72) Inventor: Hidetsune Nonaka, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 9 days.

(21) Appl. No.: 16/486,685

(22) PCT Filed: Aug. 31, 2017

(86) PCT No.: PCT/JP2017/031493
§ 371 (c)(1),
(2) Date: Aug. 16, 2019

(87) PCT Pub. No.: WO2018/150613
PCT Pub. Date: Aug. 23, 2018

(65) Prior Publication Data
US 2020/0055432 A1 Feb. 20, 2020

(30) Foreign Application Priority Data

Feb. 17, 2017 (JP) .............................. JP2017-027713
Aug. 28, 2017 (JP) .............................. JP2017-163563

(51) Int. Cl.
*B60N 2/75* (2018.01)
(52) U.S. Cl.
CPC ............. *B60N 2/753* (2018.02); *B60N 2/767* (2018.02)
(58) Field of Classification Search
CPC ........ B60N 2/753; B60N 2/767; A47C 7/543; A47C 7/541
(Continued)

(56) References Cited

U.S. PATENT DOCUMENTS 4,953,259 A * 9/1990 Frye ..................... E05D 11/06
16/225
6,916,068 B2 * 7/2005 Kitamura ............... B60N 2/767
297/411.3
(Continued)

FOREIGN PATENT DOCUMENTS

| JP | 2005118311 | 5/2005 |
| JP | 2010088832 | 4/2010 |
| JP | 2015044440 | 3/2015 |

OTHER PUBLICATIONS

International Search Report issued for International Patent Application No. PCT/JP2017/031493, dated Nov. 7, 2017, 3 pages including English translation.
(Continued)

*Primary Examiner* — Milton Nelson, Jr.
(74) *Attorney, Agent, or Firm* — Hamre, Schumann, Mueller & Larson, P.C.

(57) ABSTRACT

An armrest device is provided in which deformation of an armrest frame is suppressed. The armrest device includes an armrest frame, and a bracket by which the armrest frame is rotatably supported. The armrest frame has, at lengthwise extremities thereof, a base end closer to an axis of rotation and a distal end farther from the axis of rotation. The bracket includes a deformation restriction portion provided protrusively toward the armrest frame, the deformation restriction portion being a portion which faces toward the armrest frame in a direction of the axis of rotation of the armrest frame and which is located on one side of the axis of rotation on which the base end is located, when an armrest is in a use position.

19 Claims, 19 Drawing Sheets

(58) Field of Classification Search
USPC .................................................. 297/411.32
See application file for complete search history.

(56) References Cited

U.S. PATENT DOCUMENTS

| | | | | |
|---|---|---|---|---|
| 7,393,058 | B2* | 7/2008 | Omori | B60N 2/767 |
| | | | | 297/411.32 |
| 7,484,810 | B2* | 2/2009 | Yamane | B60N 2/767 |
| | | | | 297/411.32 |
| 9,398,812 | B2* | 7/2016 | Sanae | A47C 7/54 |
| 2008/0303335 | A1* | 12/2008 | van de Ven | B60N 2/767 |
| | | | | 297/411.34 |

OTHER PUBLICATIONS

Office Action issued for Japanese Patent Application No. 2017-163563, dated Aug. 3, 2021, 9 pages including English translation.

\* cited by examiner

FIG.2
(a) FOLD-AWAY OPERATION
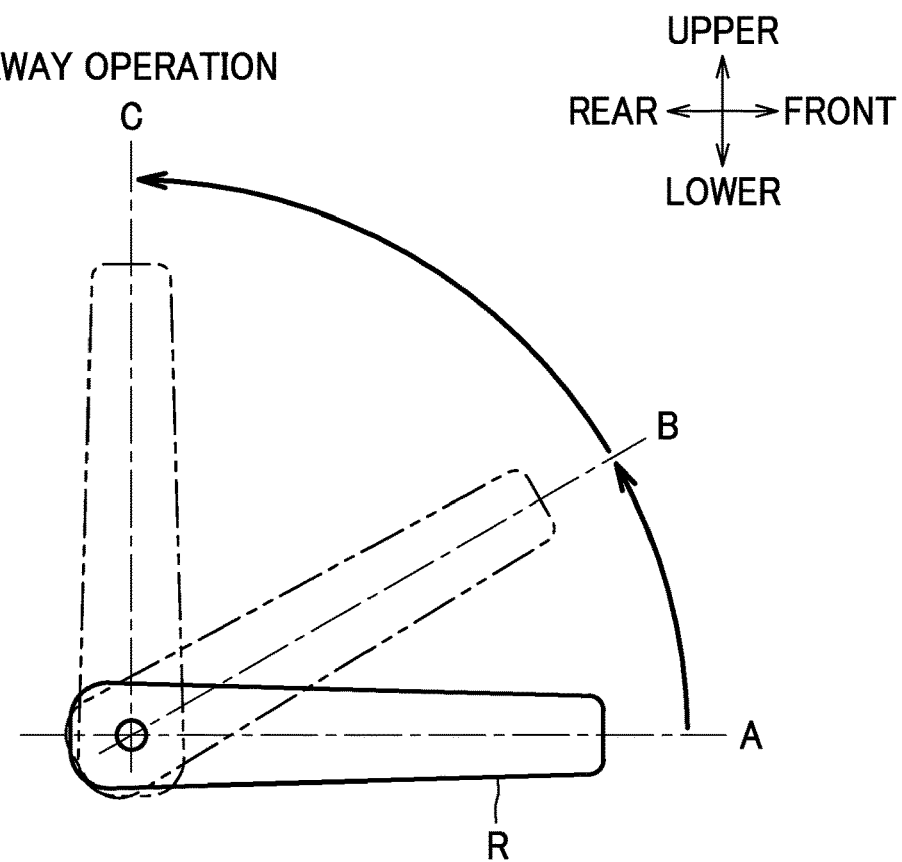
(b) PULL-OUT OPERATION
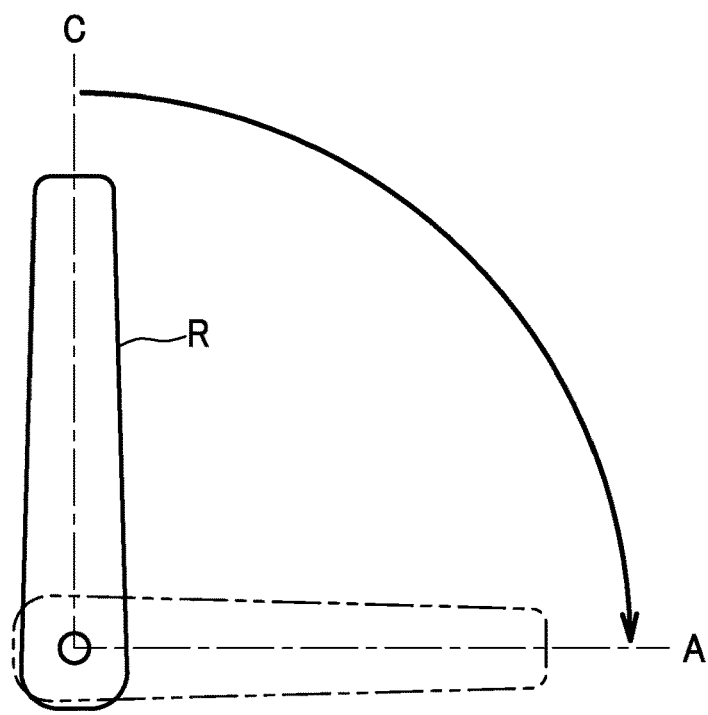

LEFT ⟷ RIGHT

LEFT ⟷ RIGHT

FIG.13
(a)
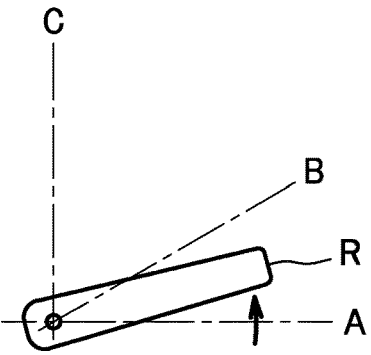
(b)
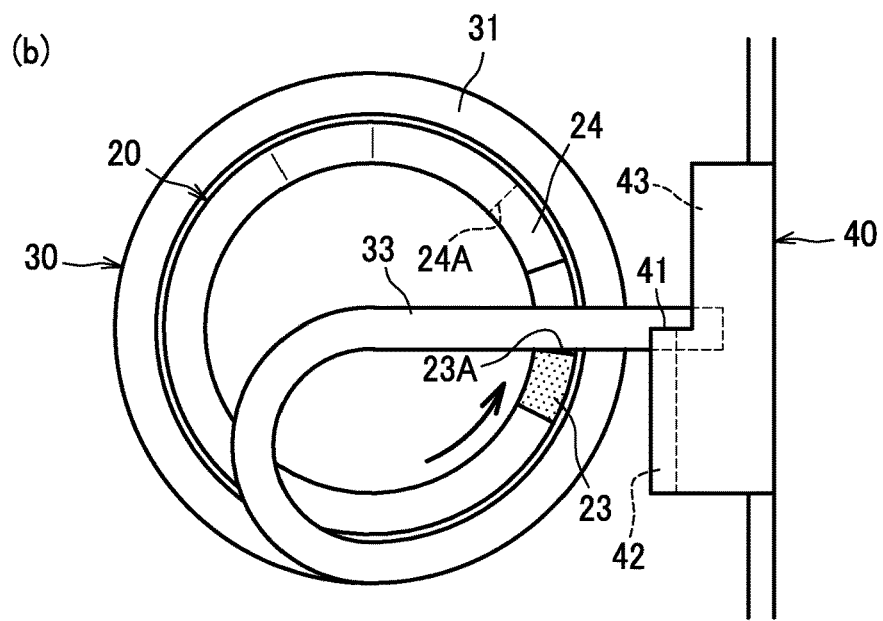
(c)
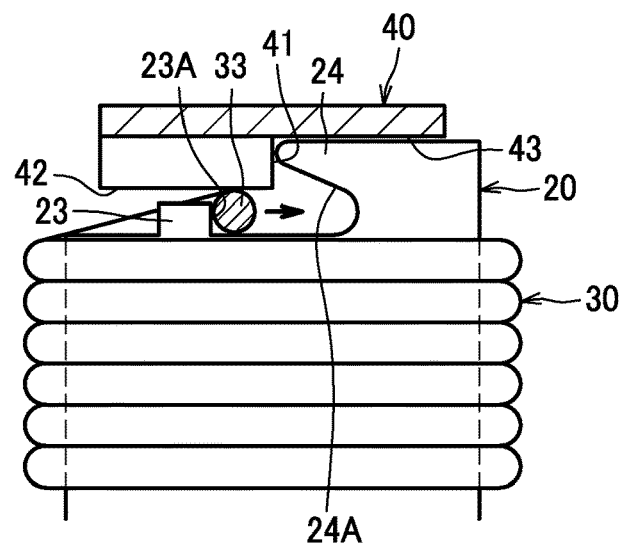

FIG.14
(a)
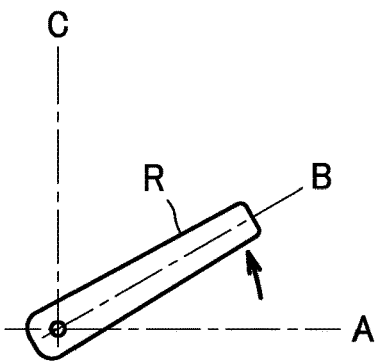
(b)
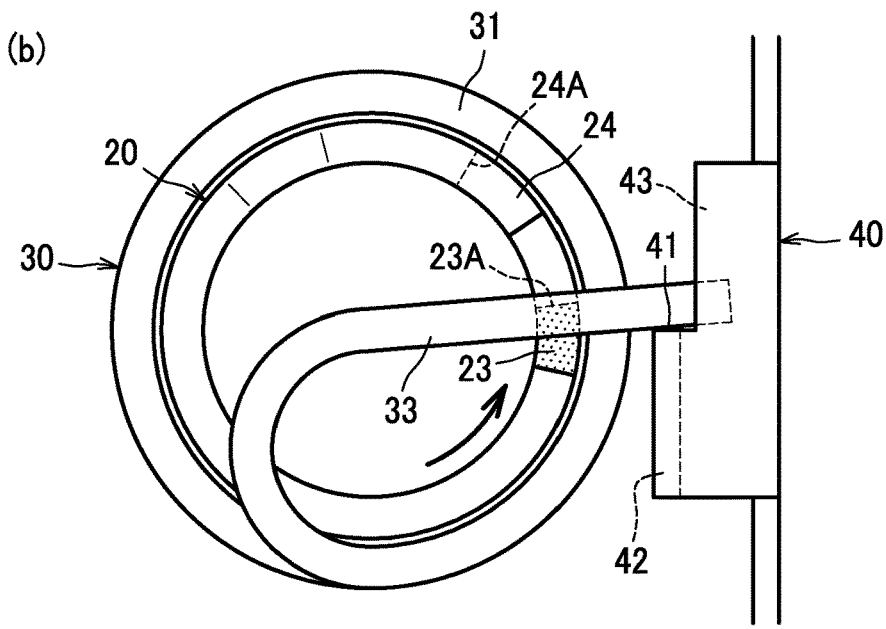
(c)
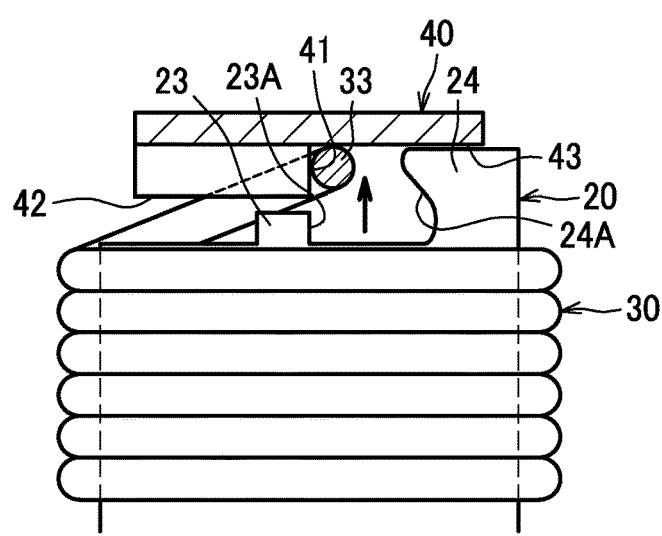

FIG.15
(a)
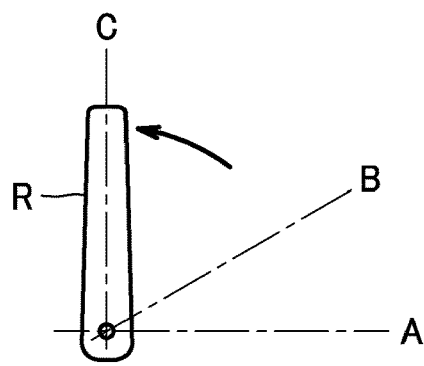
(b)
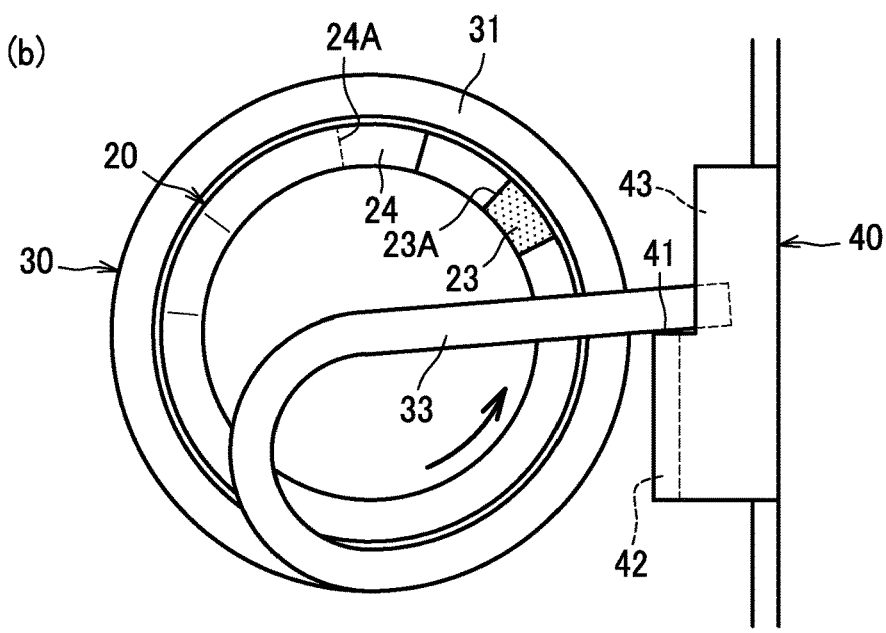
(c)
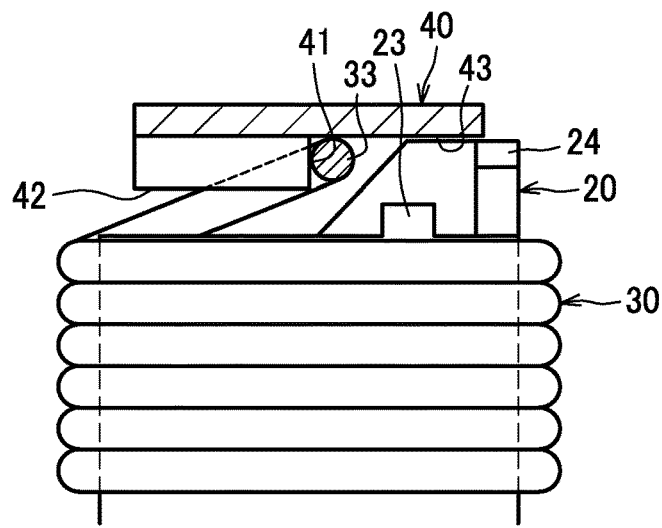

FIG.16
(a)
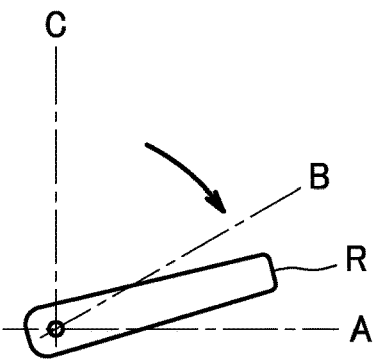
(b)
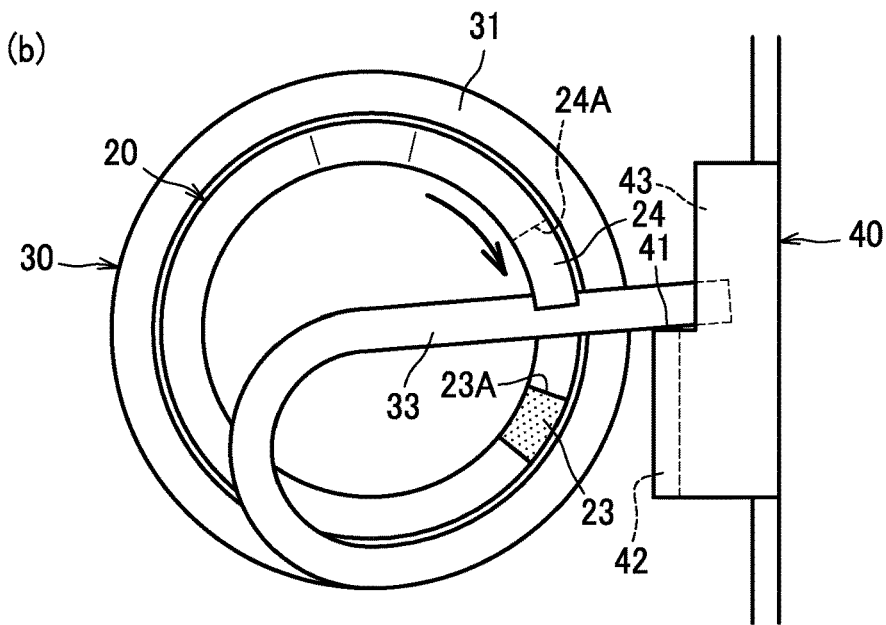
(c)
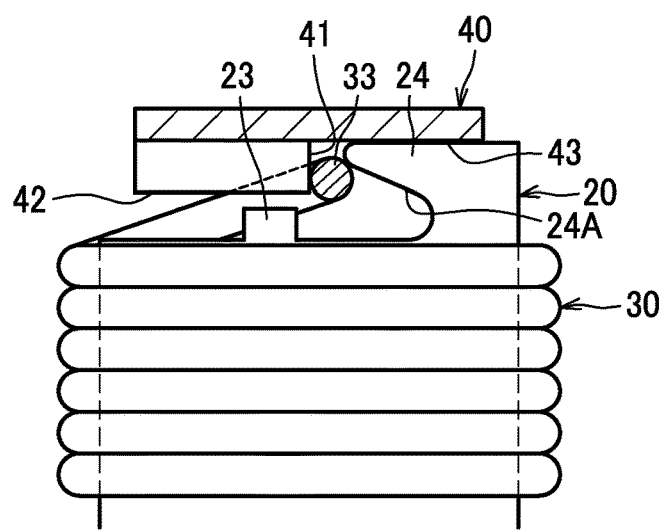

FIG.17
(a)
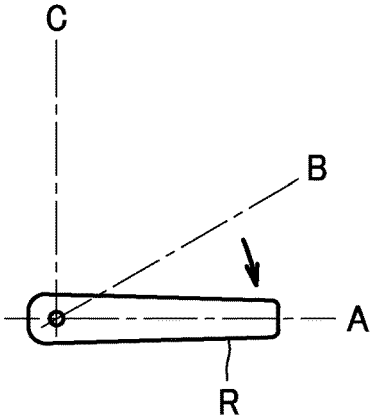
(b)
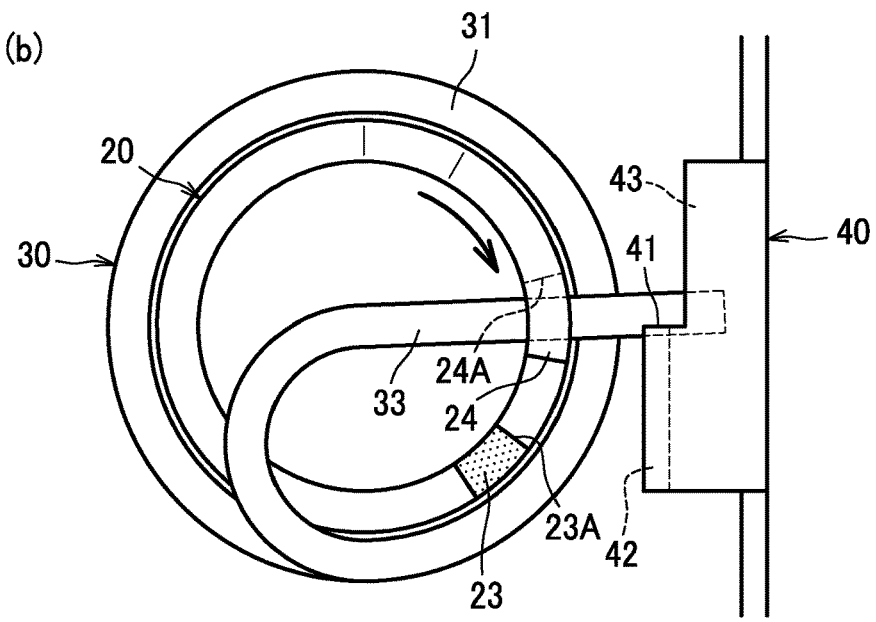
(c)
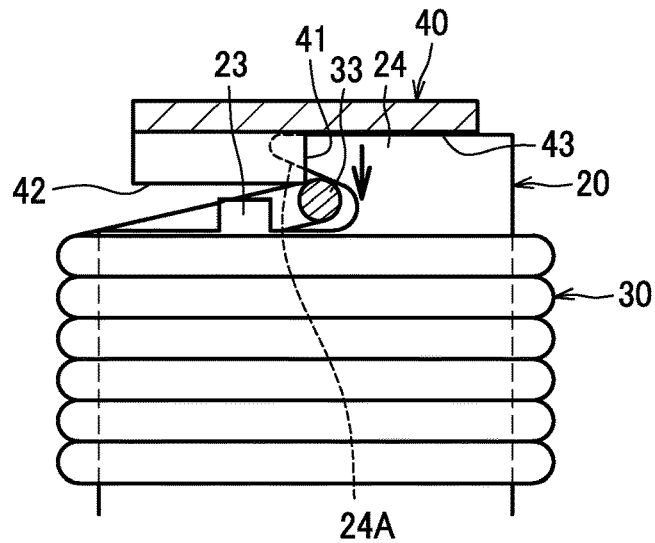

ARMREST DEVICE

TECHNICAL FIELD

The present invention relates to an armrest device including an armrest frame and a support member by which the armrest frame is rotatably supported.

BACKGROUND ART

An armrest device which comprises an armrest frame and a support member such as a mounting bracket by which the armrest frame is rotatably supported is disclosed, for example, in Patent Document 1. In this technical scheme, the mounting bracket is fixed to a side portion of the seat back frame of a car seat whereby the armrest frame is rotatably mounted to the seat back frame.

CITATION LIST

Patent Literature

Patent Document 1: JP 2015-44440 A

SUMMARY OF INVENTION

If a large load is placed on an armrest in a use position from a laterally inner side of the seat, the armrest frame would possibly yield to this large load, bend to a laterally outer side of the seat, and eventually undergo excessive deformation.

With this in view, it is an object of the present invention to provide an armrest device in which an excessive deformation of an armrest frame can be suppressed.

It is another object of the present invention to achieve reduction in the total weight of an armrest frame while ensuring the rigidity of the armrest frame.

It is yet another object of the present invention to improve the rigidity of the armrest frame.

It is yet another object of the present invention to reduce the number of parts which constitute the support member, and/or to make the support member simple in construction.

It is yet another object of the present invention to reduce the vibration noise of the armrest frame.

The present invention as contrived to achieve the above-described objects provides an armrest device comprising an armrest frame and a support member by which the armrest frame is rotatably supported, wherein the armrest frame has, at lengthwise extremities thereof, a base end closer to an axis of rotation and a distal end farther from the axis of rotation, and wherein at least one of the armrest frame and the support member includes a first restriction portion provided protrusively toward another of the armrest frame and the support member, the first restriction portion being a portion at which the armrest frame and the support member face toward each other in a direction of the axis of rotation of the armrest frame and which is located on one side of the axis of rotation on which the base end is located, when an armrest is in a use position.

With this configuration, if the armrest in the use position receives a large load from a laterally inner side of a seat and tends to deform toward a laterally outer side, then the first restriction portion provided in the at least one of the armrest frame and the support member may contact the other of the armrest frame and the support member. Accordingly, deformation toward the laterally outer side beyond this state is restricted, so that such an excessive deformation as to result in bending of the armrest frame to the laterally outer side of the seat can be restricted.

The armrest device as described above may be configured such that when the armrest is in the use position, the first restriction portion is so located as to overlap a straight line produced between the axis of rotation and the base end of the armrest frame as viewed in the direction of the axis of rotation.

With this feature, if the armrest in the use position receives a large load from a laterally inner side of the seat, the first restriction portion provided in at least one of the armrest frame and the support member contacts the other of the armrest frame and the support member on the straight line produced between the axis of rotation of the armrest and the base end; therefore, an excessive deformation of the armrest frame can be suppressed effectively by the first restriction portion.

The armrest device as described above may be configured such that the first restriction portion is provided in the support member, wherein when the armrest is in the use position, the first restriction portion is so located as to overlap the base end of the armrest frame as viewed in the direction of the axis of rotation.

With this feature, if the armrest in the use position receives a large load from a laterally inner side of the seat, the base end of the armrest frame contacts the first restriction portion provided in the support member; therefore, an excessive deformation of the armrest frame can be suppressed effectively by the first restriction portion.

The armrest device as described above may be configured such that the armrest frame includes a main frame and a reinforcing frame having a thickness greater than a thickness of the main frame, the reinforcing frame being so located as to lie over a portion of the main frame closer to the base end.

With this feature, the base end-side portion of the armrest frame can be provided with sufficiently high rigidity by the reinforcing frame having a thickness greater than a thickness of the main frame. On the other hand, the main frame can be made thinner in thickness and lighter in weight, with the result that the weight reduction of the armrest frame as a whole can be achieved.

The armrest device as described above may be configured such that the reinforcing frame is located on a side of the main frame which is opposite to another side of the main frame on which the support member is located, wherein the main frame and the reinforcing frame are joined together at portions thereof on the one side of the axis of rotation on which the base end is located.

With this feature, the base end portion of the main frame and the reinforce frame may be made unlikely to separate, so that the rigidity of the armrest frame can be improved. Moreover, if the armrest in the use position receives a large load from a laterally inner side of a seat and a portion of the main frame closer to the distal end tends to deform toward a laterally outer side, then the portion of the main frame closer to the base end tends to deform toward a laterally inner side away from the reinforcing frame; however, because the main frame and the reinforcing frame are joined together at portions thereof closer to the base end, the main frame is reinforced by the reinforcing frame, so that an excessive deformation of the main frame can be suppressed effectively.

The armrest device as described above may be configured such that the main frame includes a first base portion, a first sidewall portion extending from an end of the first base portion closer to the base end on a side of the first base portion which is opposite to another side of the first base portion on which the support member is located, and a first folded portion extending from an end of the first sidewall portion and having a distal end portion thereof folded toward the first base portion, wherein the reinforcing frame includes a second base portion so provided as to lie over the first base portion, a second sidewall portion extending from an end of the second base portion closer to the base end on a side of the second base portion which is opposite to another side of the second base portion on which the support member is located, the second sidewall portion being so provided as to lie over the first sidewall portion, and a second folded portion extending from an end of the second sidewall portion and having a distal end portion thereof folded toward the second base portion, the second folded portion being so provided as to lie over the first folded portion, and wherein the reinforcing frame and the main frame are joined together at overlying portions of the first folded portion and the second folded portion.

With these features, the main frame and the reinforcing frame can be joined together to thereby improve the rigidity of the armrest frame, without welding or the like.

The armrest device as described above may be configured such that the distal end portions of the first folded portion and the second folded portion are located with a gap left between each of the distal end portions and the second sidewall portion.

With this feature, the rigidity of the armrest frame can be increased more in comparison with an alternative configuration in which the folded portions are folded in such a way as to establish contact between the folded portions and the second sidewall portion.

The armrest device as described above may be configured such that the armrest frame includes a protruding portion provided protrusively toward the support member, wherein the support member includes, in addition to the first restriction portion, a second restriction portion protruding toward the armrest frame, contactable with the protruding portion, and thereby restricting rotation of the armrest frame, and wherein the first restriction portion and the second restriction portion are formed as a continuous projection.

With these features, the number of parts that constitutes the support member may be reduced and the support member may be made simpler in construction, in comparison with an alternative configuration in which the first restriction portion and the second restriction portion are formed as separate projections.

The armrest device as described above may be configured such that the armrest frame includes a main frame and a reinforcing frame so located as to lie over a portion of the main frame closer to the base end on a side of the main frame which is opposite to another side of the main frame on which the support member is located, the reinforcing frame having a thickness greater than a thickness of the main frame, wherein the protruding portion is provided in the reinforcing frame, extending through a through hole formed in the main frame to a side of the main frame on which the support member is located.

With these features, the rigidity of the armrest frame can be ensured by the reinforcing frame having a greater thickness, and the reduction in the total weight of the armrest frame can be achieved by reduction in the thickness of the main frame. Moreover, the rigidity of the protruding portion can be increased more, in comparison with an alternative configuration in which a protruding portion is provided in the main frame. Also, when the main frame and the reinforcing frame are assembled together, the protruding portion of the reinforcing frame can be engaged in the through hole of the main frame so that the reinforcing frame can be located in place relative to the main frame.

The armrest device as described above may be configured such that the support member is a bracket by which the armrest frame is mountable to a frame of a seat, wherein the first restriction portion is provided in the bracket.

In the armrest device as described above, it may be preferable that the armrest frame includes a main frame and a reinforcing frame so provided as to lie over the main frame in contact with the main frame, wherein the reinforcing frame includes a portion at which the reinforcing frame and the main frame face toward each other in the direction of the axis of rotation and part of which is separate from the main frame.

With this configuration, the reinforcing frame lying over the main frame in contact with the main frame serves to reinforce the main frame, and the portion of the reinforcing frame at which the reinforcing frame and the main frame face toward each other in the direction of the axis of rotation is partially separate from the main frame to form a wider portion in the direction of the axis of rotation so that the enhanced rigidity and weight reduction can be achieved.

In the armrest device as described above, it may be preferable that a distance between the part of the reinforcing frame and the main frame is greater than a thickness of the main frame.

It may also be preferable that a distance between the part of the reinforcing frame and the main frame is greater than a thickness of the reinforcing frame.

It may be further preferable that a distance between the part of the reinforcing frame and the main frame is greater than a sum of a thickness of the main frame and a thickness of the reinforcing frame.

The greater distance between the part of the reinforcing frame and the main frame can serve to make the rigidity of the armrest frame greater.

The reinforcing frame may preferably include an insertion hole through which a bolt for fastening the reinforcing frame to a shaft is disposed, and a flange portion provided at a circumferential edge of the insertion hole protrusively in a direction along the axis of rotation, wherein a distal end of the flange portion is in contact with the main frame.

With this configuration, in which the distal end of the flange portion is in contact with the main frame, the main frame and the reinforcing frame together may form a box shape, so that the armrest frame can be enhanced in rigidity.

The armrest device as described above may, preferably, further comprise a spacer disposed between the part of the reinforcing frame and the main frame.

Provision of such a spacer serves to have a space left between the main frame and reinforcing frame even when the armrest frame is attached to the shaft by fastening using a bolt or the like, so that the rigidity of the armrest frame can be increased.

The spacer may preferably be in contact with the main frame and with the reinforcing frame in the direction of the axis of rotation.

With this feature in which the spacer is in contact with the main frame and with the reinforcing frame as described above, vibrations of the main frame and the reinforcing frame can be suppressed, and thus the vibration noises of the armrest frame can be suppressed.

In the armrest device as described above, preferably, the reinforcing frame may have an engageable hole in which a projection provided at an end of a shaft is engageable, and the spacer may include a receptacle hole or receptacle recess that receives the projection.

With this configuration, the armrest frame can be enhanced in rigidity, particularly, around the projection of the shaft on which a rotary torque is applied.

In the armrest as described above, the spacer may include a through hole through which a bolt for fastening the reinforcing frame to a shaft is disposed.

With this feature, the tightening force of the bolt can be received by the spacer around the through hole, and thus the space between the main frame and the reinforcing frame can be formed without fail, so that the rigidity of the armrest frame can be enhanced.

In the armrest device as described above, the spacer may preferably contain plastic or rubber.

Such a spacer made of plastic or rubber can serve to effectively suppress vibration noise of the armrest frame.

BRIEF DESCRIPTION OF DRAWINGS

FIG. 2 includes a schematic diagram (a) for explaining an operation of an armrest when operated to a fold-away position; and a schematic diagram (b) for explaining an operation of the armrest when operated to a pull-out position.

FIG. 13 includes views (a) to (c) showing the states of the respective members when the armrest has been turned from Position A to a position short of Position B.

FIG. 14 includes views (a) to (c) showing the states of the respective members when the armrest has been turned from Position A to Position B.

FIG. 15 includes views (a) to (c) showing the states of the respective members when the armrest has been turned from Position B to Position C.

FIG. 16 includes views (a) to (c) showing the states of the respective members when the armrest has been turned from Position C to a position short of Position A.

FIG. 17 includes views (a) to (c) showing the states of the respective members when the armrest has been turned from a position short of Position A to Position A.

DESCRIPTION OF EMBODIMENTS

Hereafter, a description will be given of one embodiment of the present invention with reference made to the accompanying drawings.

Figure 1:
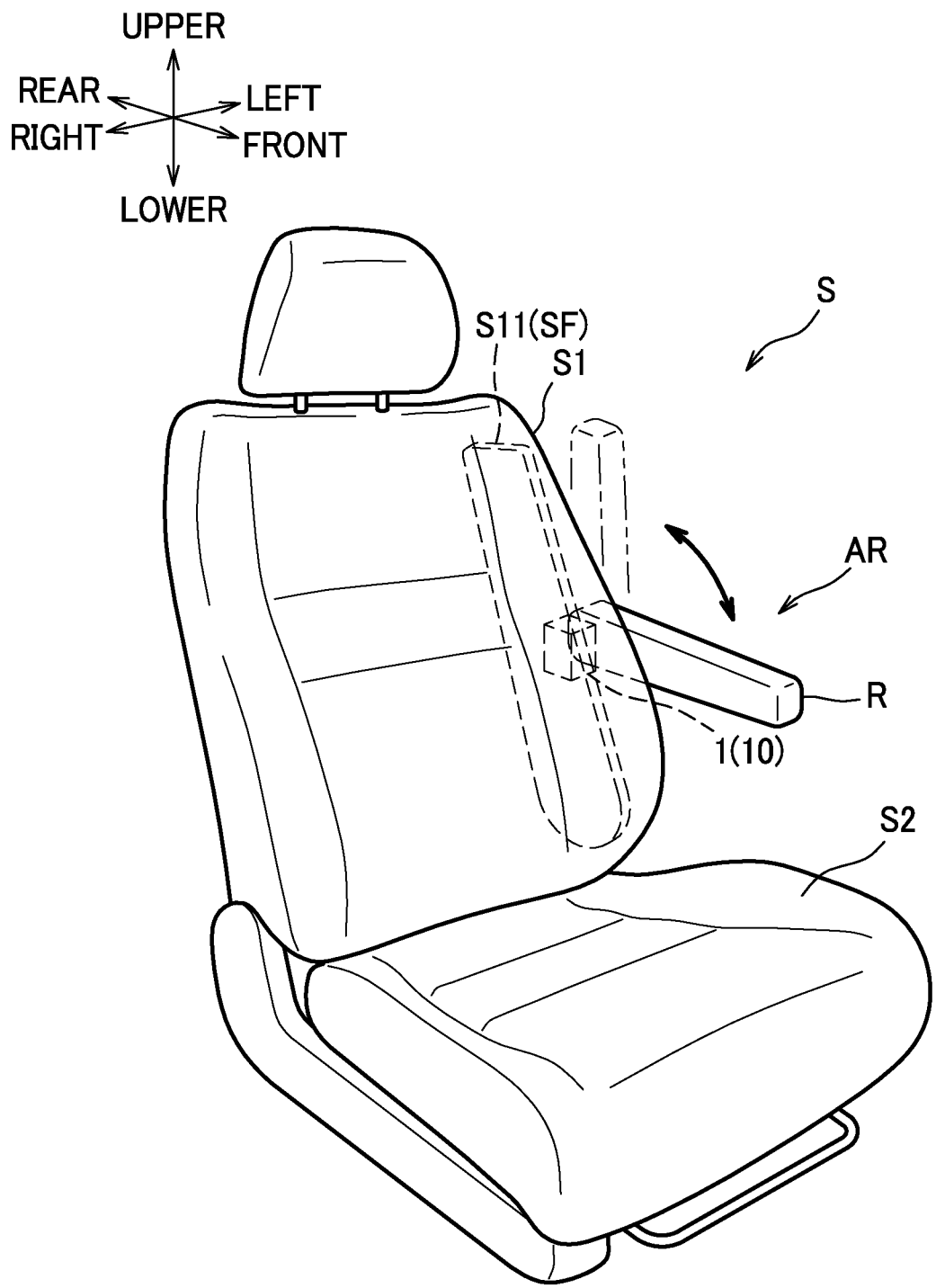
FIG. 1 is a perspective view of a vehicle seat according to an embodiment.

As shown in FIG. 1, a vehicle seat according to one embodiment is configured, for example, as a car seat S to be installed in an automobile, and includes a seat back S1, a seat cushion S2, an armrest device AR, and the like. In this description, the front/rear (frontward/rearward), left/right (leftward/rightward; lateral), and upper/lower (upward/downward; vertical) correspond to the front/rear, left/right and upper/lower directions as viewed from an occupant seated on the car seat S.

The car seat S incorporates a seat frame SF made of metal which constitutes a framework thereof. The car seat S is constructed of the seat frame SF upholstered with padding made of urethane foam or other cushiony material and outer covering made of leather, fabrics or the like. The seat frame SF includes side frames S11 as side frames that constitute left and right frames of the seat frame SF.

The armrest device AR is disposed at a left side of the seat back S1, and includes an armrest R and a one-way clutch 1. The arm rest R is fixed to a shaft 20 (see FIG. 3) of the one-way clutch 1 fixed to the side frame 11 that constitutes a portion of the seat frame SF. The armrest R can be manipulated to turn together with the shaft 20 of the one-way clutch 1 relative to the side frame S11.

To be more specific, as shown in FIG. 2(a), the armrest R can be manipulated to turn between a pull-out state (Position A) where a distal end thereof faces frontward and a fold-away state (Position C) where the distal end thereof faces upward. When the armrest R is subjected to a fold-away operation, i.e., manipulated to be moved from the pull-out state to the fold-away state, the armrest R in a predetermined angular range from the pull-out state toward the fold-away state (a range from Position A to Position B) is in a locked state where a turn thereof in one direction, specifically, in a downward direction is restricted by the one-way clutch 1. To elaborate, the armrest R in the locked state can be turned upward, but cannot be turned downward. On the other hand, if the armrest R subjected to the fold-away operation is in a range from Position B to Position C, the armrest R is in an unlocked state where turns thereof in two directions, specifically, in upward and downward directions are permitted.

As shown in FIG. 2(b), the armrest R subjected to a pull-out operation, i.e., manipulated to be moved from the fold-away state (Position C) toward the pull-out state (Position A) is in in an unlocked state where the turns in the upward and downward directions are permitted. When the armrest R subjected to a pull-out operation has been moved fully to Position A, the armrest R then gets back to the locked state.

In this way, the armrest R is configured to be switchable between the locked state and the unlocked state by the one-way clutch 1.

Figure 3:
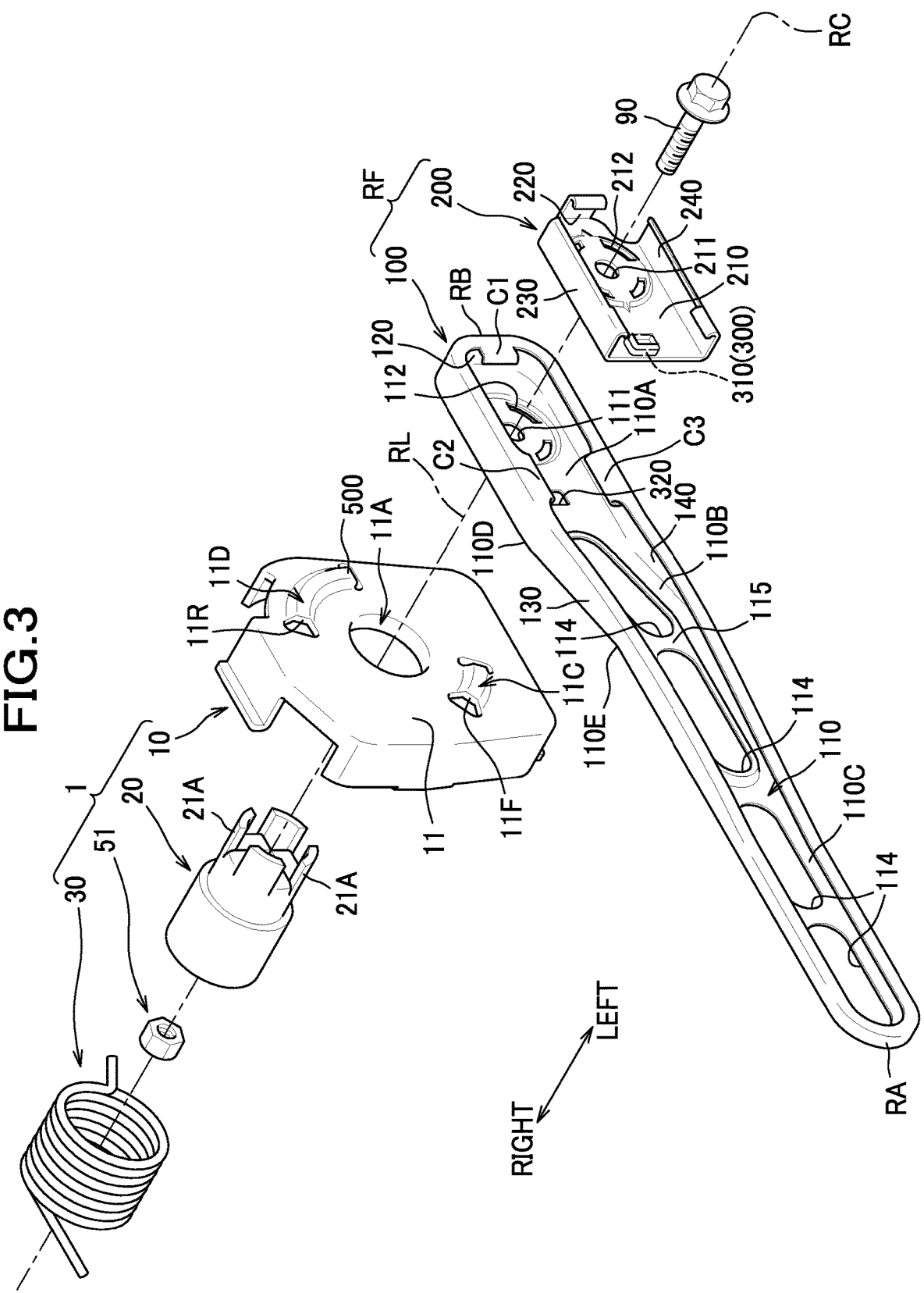
FIG. 3 is an exploded perspective view of an armrest frame and a one-way clutch.

As shown in FIG. 3, the armrest R includes an armrest frame RF rotatable relative to the seat frame SF. Although not illustrated, the armrest R is constructed of the armrest frame RF covered with outer covering made of leather, fabrics or the like, with plastic foam such as expanded polyurethane, etc. injected between the armrest frame RF and the outer covering. The armrest frame RF includes a main frame 100 having an elongate shape, a reinforcing frame 200 fixed to a shaft 20 of the one-way clutch 1 through the main frame 100, and a spacer 600.

The main frame 100 is a member which constitutes a framework of the armrest R, and is formed by sheet-metal working of a metal sheet. To be more specific, the main frame 100 has a cross-sectional shape such that peripheries of an elongate sheet member are bent leftward, and an end portion of a bent portion is further crooked inward into a shape approximately like a segment of an arc (see FIG. 6).

In the present embodiment, with respect to the armrest frame RF, the left side corresponds to "a side opposite to another side on which a support member is located", and the right side of the armrest frame RF corresponds to "a side on which the support member is located". Hereafter, one of two ends at lengthwise extremities of the main frame 100 (armrest frame RF) which is closer to an axis RL of rotation will be referred to as base end RB, and the other end which is farther from the axis RL of rotation is referred to as distal end RA. Also in the following description, an end portion at the base end RB may be referred to as "base end portion", and an end portion at the distal end RA may be referred to as "distal end portion". In addition, the direction of the length of the main frame 100 (armrest frame RF) will be referred to simply as "direction of the length or lengthwise (direction)", and the direction of the breadth of the main frame 100 which is orthogonal to the lengthwise direction and to the lateral direction will be referred to as "direction of the breadth or breadthwise (direction)".

The main frame 100 mainly includes an elongate first base portion 110, a first sidewall portion 120 extending from an end (at an extremity on a base end RB side) of the first base portion 110 leftward, a third sidewall portion 130 extending from one end (at an extremity in the breadthwise direction) of the first base portion 110 leftward, and a fifth sidewall portion 140 extending from another end (at an opposite extremity in the breadthwise direction) of the first base portion 110 leftward.

Figure 4:
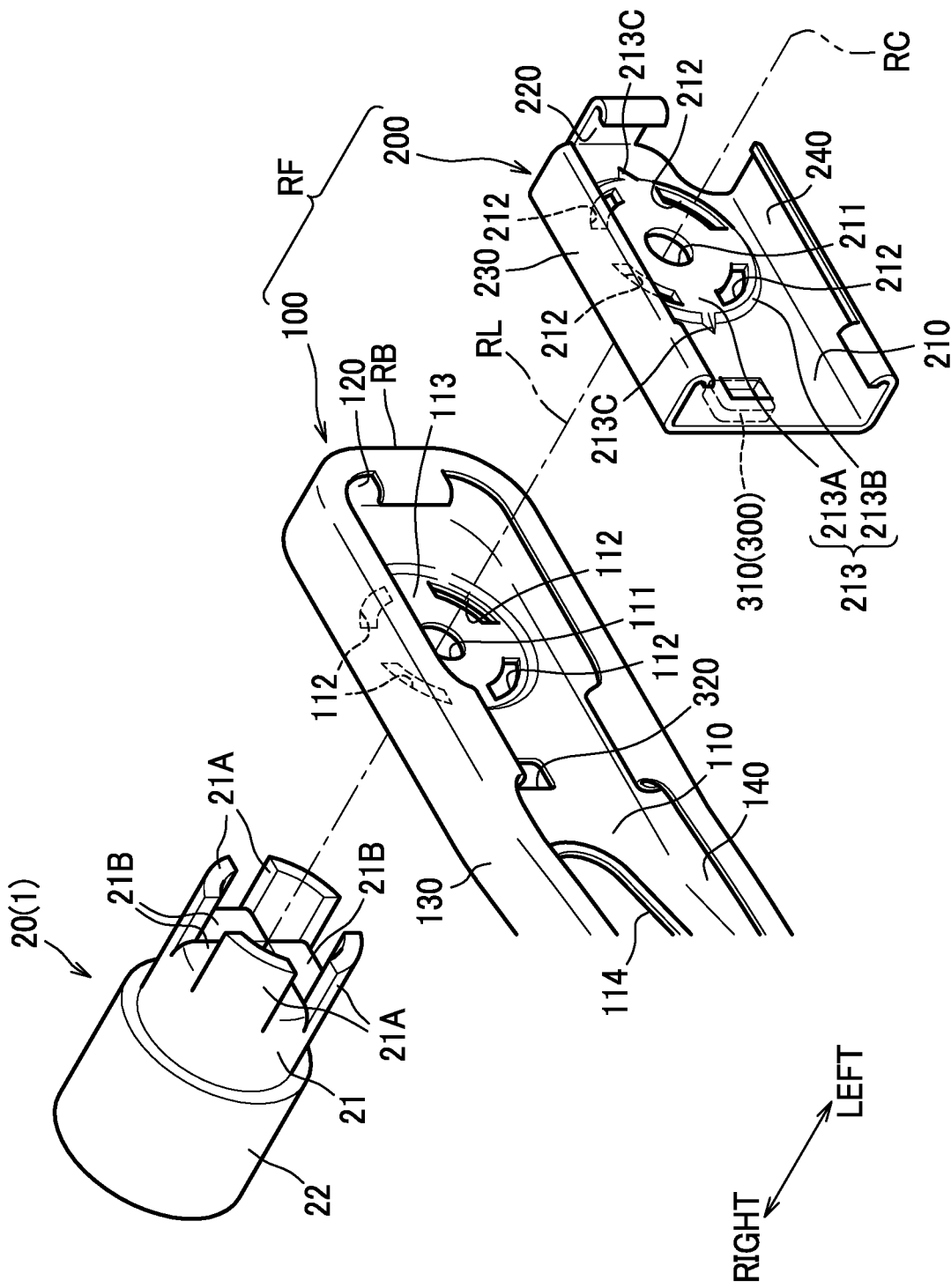
FIG. 4 is an enlarged perspective view of a base end portion of the armrest frame and a shaft of the one-way clutch.

As shown in FIG. 4, the first base portion 110 has an insertion hole 111 and through holes 112, which are formed in a base end portion of the first base portion 110. To be more specific, a recessed portion 113 recessed rightward is formed in the base end portion of the first base portion 110, and the insertion hole 111 and the through holes 112 are formed at a bottom portion of the recessed portion 113. The recessed portion 113 is formed to have an approximately circular shape of which a center coincides with the axis RL of rotation of the armrest frame RF.

The insertion hole 111 is a hole through which a bolt 90 (see FIG. 3) for fixing the shaft 20 of the one-way clutch 1 to the armrest frame RF is to be inserted. The insertion hole 111 is disposed approximately at the center of the bottom portion of the recessed portion 113, and formed to have an approximately circular shape of which a center coincides with the axis RL of rotation.

The through holes 112 are holes through which projections 21A of the shaft 20 are to be inserted. The through holes 112 are provided in a plurality of (specifically, four) positions corresponding to a plurality of projections 21A of the shaft 20, and each of the four through holes 112 is formed approximately in the shape of a segment of a circle of which a center coincides with the axis RL of rotation. The four through holes 112 are arranged approximately equidistantly along a circumference of a circle (around the insertion hole 111) of which a center coincides with the axis RL of rotation.

Figure 5:
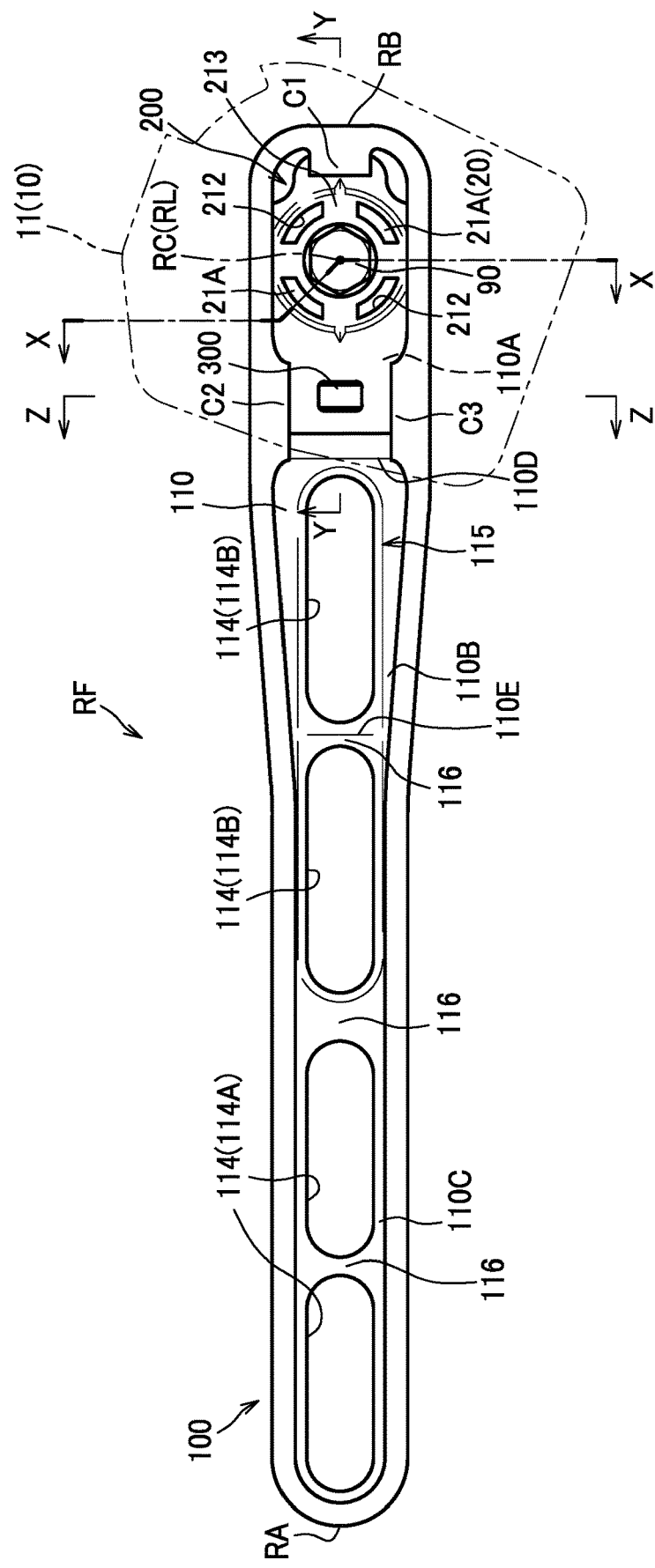
FIG. 5 is a side view of the armrest frame.

As shown in FIG. 5, the first base portion 110 has a plurality of lightening holes 114 arranged along its lengthwise direction. The plurality of lightening holes 114 include a first lightening hole 114A and a second lightening hole 114B.

Of the plurality of lightening holes 114, the first lightening hole 114A is a hole provided in a distal end portion of the first base portion 110 and formed approximately in an oval shape of which the length is aligned with the lengthwise direction. The first lightening hole 114A is formed in two positions; two first lightening holes 114A are arranged in the lengthwise direction.

The second lightening hole 114B is a hole provided between the first lightening hole 114A and the axis RL of rotation, in other words, generally in a central portion in a direction of the length of the first base portion 110, and formed approximately in an oval shape of which the length is aligned with the lengthwise direction. The second lightening hole 114B is formed in two positions; two second lightening holes 114B are arranged in the lengthwise direction. To be more specific, a bulging portion 115 bulging out leftward approximately in an oval shape of which the length is aligned with the lengthwise direction is formed generally in the central portion in the direction of the length of the first base portion 110; the second lightening holes 114B are formed in the bulging portion 115 and arranged in the lengthwise direction.

Portions interposed between two adjacent lightening holes 114 form reinforcing portions 116 extending in the breadthwise direction and connecting one end portion (at an extremity in the breadthwise direction) of the first base portion 110 to another end portion (at an opposite extremity in the breadthwise direction) of the first base portion 110.

As shown in FIG. 3, the first base portion 110 includes a first portion 110A that is a portion closer to the base end RB, a third portion 110C that is a portion closer to the distal end RA, and a second portion 110B that is a portion between the first portion 110A and the third portion 110C. The first portion 110A is provided to orient approximately perpendicular to the axis RL of rotation. As the first base portion 110 is bent at a first bent portion 110D, the second portion 110B extends from an end (at an extremity closer to the distal end RA) of the first portion 110A in a leftward-angled direction toward the distal end RA. As the first base portion 110 is angled rightward at a second bent portion 110E, the third portion 110C extends from an end (at an extremity closer to the distal end RA) of the second portion 110B in a direction approximately parallel to the first portion 110A.

As shown in FIG. 5, bent portions provided respectively between the first portion 110A and the second portion 110B and between the second portion 110B and third portion 110C are portions in which no lightening hole 114 is formed. In other words, the first bent portion 110D and the second bent portion 110E are formed at lengthwise positions in which no lightening hole 114 is formed. To be more specific, the first bent portion 110D is formed between the bulging portion 115 and a stopper portion 300 which will be described later. Similarly, the second bent portion 110E is formed in the reinforcing portion 116 formed between the two second lightening holes 114B.

As shown in FIG. 4, the reinforcing frame 200 is a member for reinforcing the main frame 100, and formed in a manner similar to that in which the main frame 100 is formed, i.e., by sheet-metal working of a metal sheet. To be more specific, the reinforcing frame 200 has a cross-sectional shape such that a base end portion and side portions (at extremities in the breadthwise direction) of a sheet member are bent leftward. The reinforcing frame 200 is formed of a sheet member having a thickness greater than a thickness of a sheet member of which the main frame 100 is formed. By way of example, the thickness of the reinforcing frame 200 is approximately 1.5 times greater than that of the main frame 100.

The reinforcing frame 200 mainly includes a second base portion 210, a second sidewall portion 220 extending from an end (at an extremity on a base end RB side) of the second base portion 210 leftward, a fourth sidewall portion 230 extending from one end (at an extremity in the breadthwise direction) of the second base portion 210 leftward, and a sixth sidewall portion 240 extending from another end (at an opposite extremity in the breadthwise direction) of the second base portion 210 leftward.

The second base portion 210 has an insertion hole 211 and engageable holes 212 formed therein. To be more specific, a bulging portion 213 bulging leftward is formed in the second base portion 210, and the insertion hole 211 and the engageable holes 212 are formed in this bulging portion 213.

The insertion hole 211 is a hole through which the bolt 90 (see FIG. 3) is to be inserted. The insertion hole 211 is disposed approximately at the center of the bulging portion 213, and formed to have an approximately circular shape of which a center coincides with the axis RL of rotation. A flange portion 211A is provided at a circumferential edge of the insertion hole 211 protrusively in a direction along the axis RL of rotation (see FIG. 6).

The engageable holes 212 are holes in which the projections 21A of the shaft 20 are engageable. The engageable holes 212 are provided in a plurality of (specifically, four) positions corresponding to a plurality of projections 21A of the shaft 20, and each of the four engageable holes 212 is formed approximately in the shape of a segment of a circle of which a center coincides with the axis RL of rotation. The four engageable holes 212 are arranged approximately equidistantly along a circumference of a circle (around the through hole 121) of which a center of rotation coincides with the axis RL of rotation, in such positions that they are aligned with the through holes 112 of the main frame 100 as viewed from a left or right side.

The bulging portion 213 is formed approximately in a circular shape of which a center coincides with the axis RL of rotation, and so sized as to be approximately coextensive with the recessed portion 113 of the main frame 100 as viewed from a left or right side. The bulging portion 213 includes a first portion 213A arranged in a position shifted to the left in the second base portion 210, and a second portion 213B connecting the approximately circular peripheral edge of the first portion 213A to the second base portion 210. The first portion 213A is formed parallel to the second base portion 210. At the lengthwise extremities of the second portion 213B, reinforcing portions 213C are formed which protrude from the second portion 213B and the second base portion 210 leftward and extend in the lengthwise direction are formed.

As shown in FIG. 5, the reinforcing frame 200 is so provided as to lie over a portion of the main frame 100 in a position closer to the base end RB than positions of the plurality of lightening holes 114. To be more specific, the reinforcing frame 200 is disposed around the axis RL of rotation and so provided as to lie over a portion closer to the base end RB of the main frame 100. To elaborate further, as shown in FIG. 6 and FIG. 7, the reinforcing frame 200 is disposed around the axis RL of rotation on a side of the main frame 100 opposite to another side of the main frame 100 on which a bracket 10 (support member) of the one-way clutch 1 is disposed, and so provided as to lie over the base end portion of the main frame 100.

More specifically, the reinforcing frame 200 is provided such that the second base portion 210 is located on a side of the first base portion 110 which is opposite to another side of the first base portion 110 on which the bracket 10 of the one-way clutch 1 is located, and so provided as to lie over the base end portion of the first base portion 110 in contact with the base end portion of the first base portion 110. The second sidewall portion 220 of the reinforcing frame 200 is so located on a lengthwise inner side of the first sidewall portion 120 as to lie over the first sidewall portion 230. The reinforcing frame 100 is provided such that the fourth sidewall portion 230 is so located on a breadthwise inner side of the third sidewall portion 130 as to lie over the third sidewall portion 130, and the sixth sidewall portion 240 is so located on a breadthwise inner side of the fifth sidewall portion 140 as to lie over the fifth sidewall portion 140.

Figure 6:
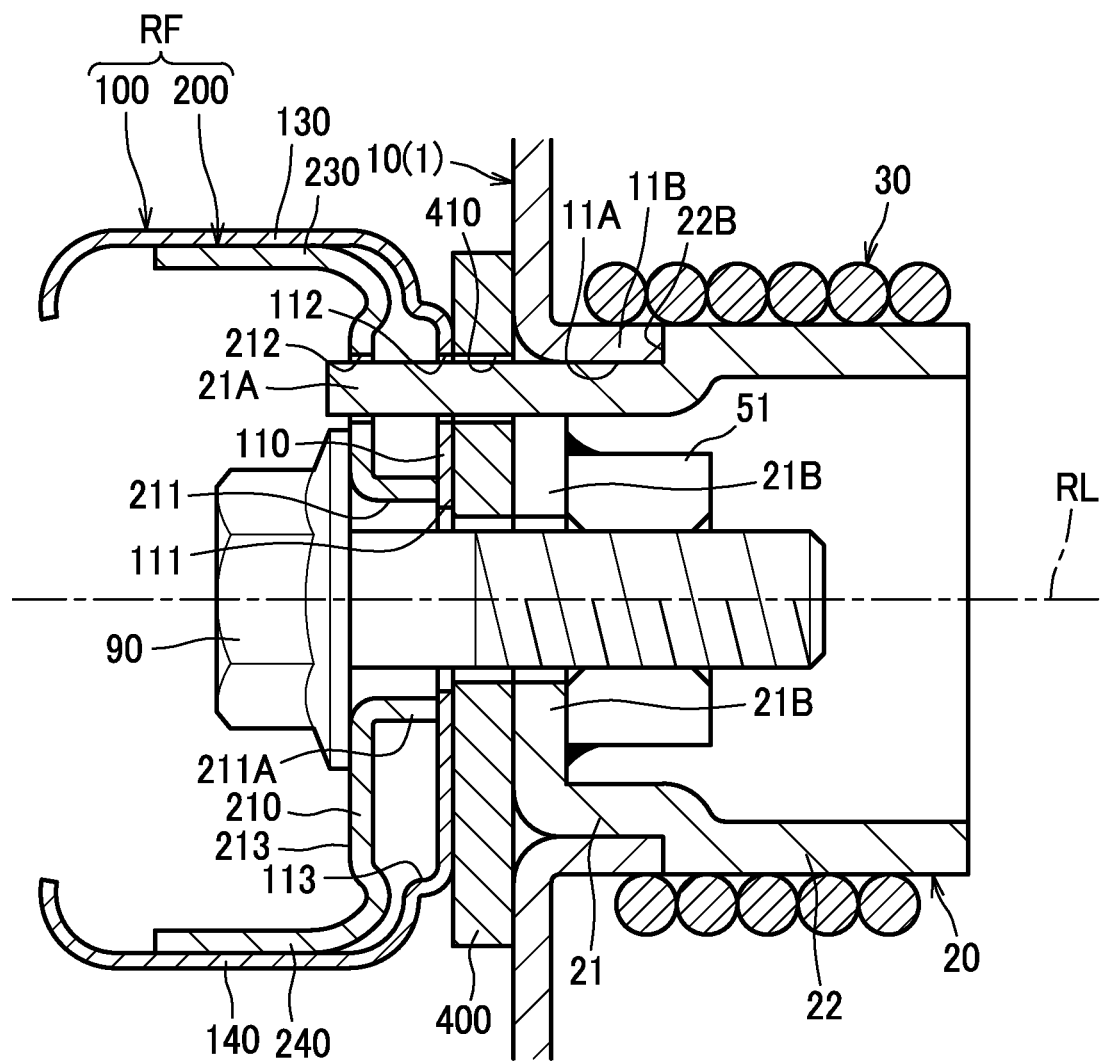
FIG. 6 is a cross section taken along the line X-X of FIG. 5.
Figure 7:
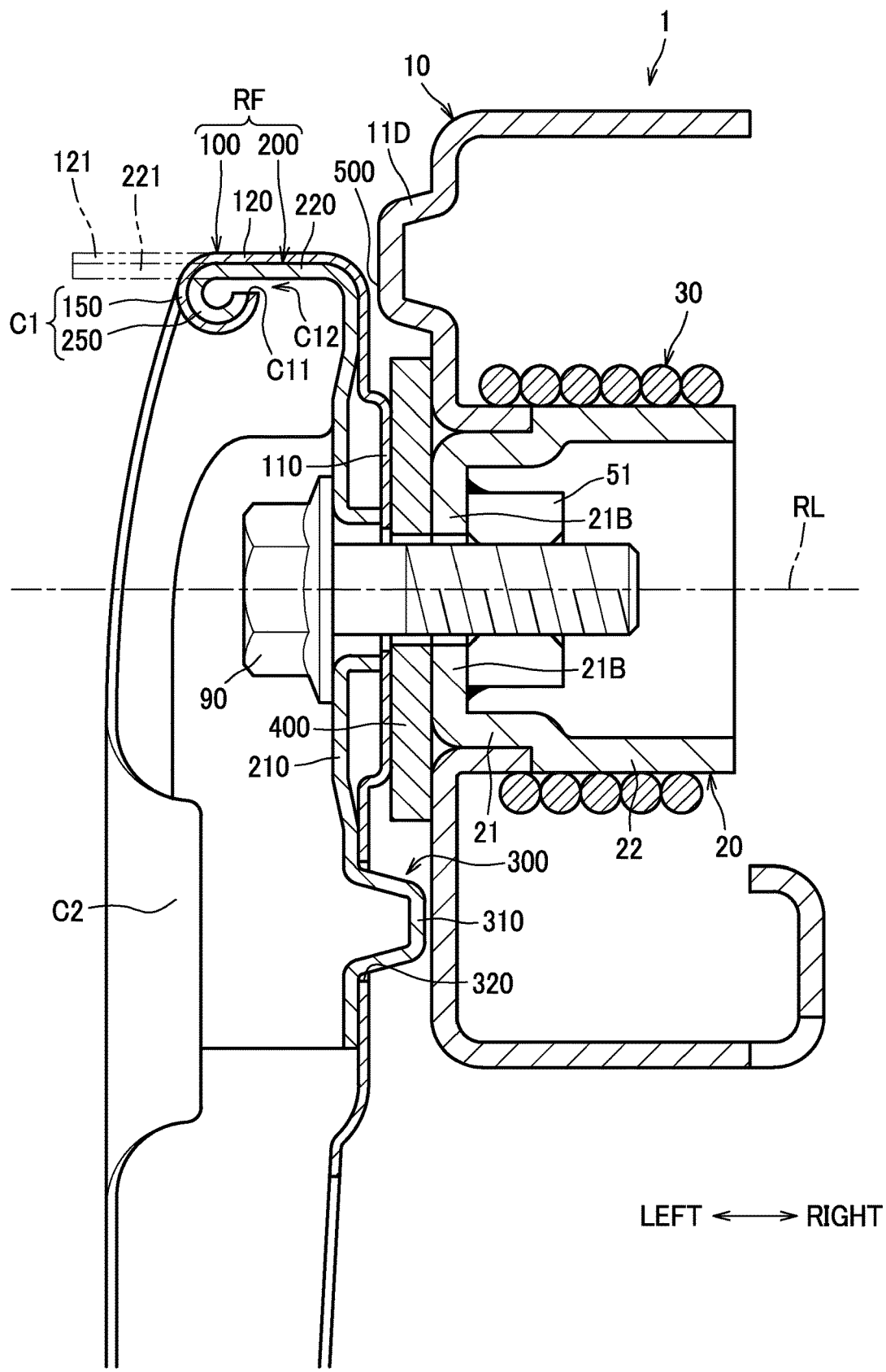
FIG. 7 is a cross section taken along the line Y-Y of FIG. 5.

As shown in FIG. 6, a portion of the reinforcing frame 200 (the bulging portion 213) is separate from the recessed portion 113 of the main frame 200. In other words, the reinforcing frame 200 includes a portion at which the reinforcing frame 200 and the main frame 100 face toward each other in the direction of the axis of rotation, and part of which, specifically a ring-shaped portion around the axis RL of rotation, is separate from the main frame 100.

A distance D between the part of the reinforcing frame 200 and the main frame 100 is greater than a thickness of the main frame 100. This distance D is also greater than a thickness of the reinforcing frame 200. Moreover, this distance D is greater than a sum of the thickness of the main frame 100 and the thickness of the reinforcing frame 200.

A distal end of the aforementioned flange portion 211A is in contact with the main frame 100. With this configuration in which the distal end of the flange portion 211A is in contact with the main frame 100, the main frame 100 and the reinforcing frame 200 together form a closed box shape, so that the armrest frame RF can be enhanced in rigidity.

As shown in FIG. 5, the reinforcing frame 200 and the main frame 100 are joined together at a first joined portion C1, a second joined portion C2 and a third joined portion C3. To be more specific, the reinforcing frame 200 and the main frame 100 are joined together at portions thereof (the first joined portion C1) closer to the base end RB of the base end portions than the axis RL of rotation, and also joined together at portions thereof (the second portion C2 and the third portion C3) closer to the distal end RA of the base end portions than the axis RL of rotation.

As shown in FIG. 7, the first joined portion C1 is overlying portions of a first folded portion 150 formed in the main frame 100 and a second folded portion 250 formed in the reinforcing frame 200. The first folded portion 150 is a portion extending from an end of the first sidewall portion 120 and having a distal end portion folded toward the first base portion 110, while the second folded portion 250 is a portion extending from an end of the second sidewall portion 220 and having a distal end portion folded toward the second base portion 210, which second folded portion 250 is so provided as to lie over the first folded portion 150.

Figure 8:
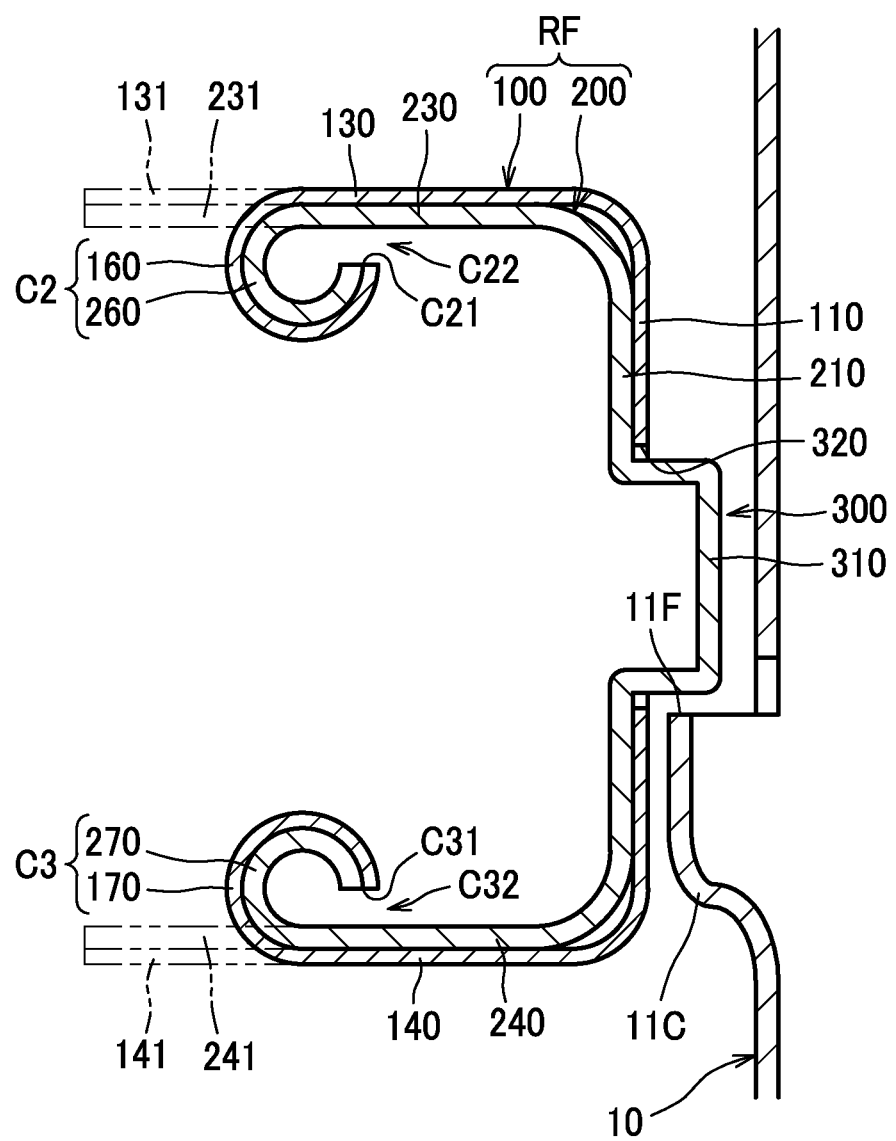
FIG. 8 is a cross section taken along the line Z-Z of FIG. 5.

As shown in FIG. 8, the second joined portion C2 is overlying portions of a third folded portion 160 formed in the main frame 100 and a fourth folded portion 260 formed in the reinforcing frame 200. The third folded portion 160 is a portion extending from an end of the third sidewall portion 130 and having a distal end portion folded toward the first base portion 110, while the fourth folded portion 260 is a portion extending from an end of the fourth sidewall portion 230 and having a distal end portion folded toward the second base portion 210, which fourth folded portion 260 is so provided as to lie over the third folded portion 160.

The third joined portion C3 is overlying portions of a fifth folded portion 170 formed in the main frame 100 and a sixth folded portion 270 formed in the reinforcing frame 200. The fifth folded portion 170 is a portion extending from an end of the fifth sidewall portion 140 and having a distal end portion folded toward the first base portion 110, while the sixth folded portion 270 is a portion extending from an end of the sixth sidewall portion 240 and having a distal end portion folded toward the second base portion 210, which sixth folded portion 240 is so provided as to lie over the fifth folded portion 170.

As shown in FIG. 4, the spacer 600 is provided between a separated portion of the reinforcing frame 200 separate from the main frame 100 and the main frame 100. The spacer 600 includes an annular portion 610 and extending portions 620.

The annular portion 610 includes, along its inner circumference, a mount guide 630 protruding radially inward. As shown in FIG. 6, the mount guide 630 protrudes only from a middle zone of the annular portion 610 in the direction of the axis of rotation. With this configuration, interference of a corner portion formed by the second base portion 210 and the flange portion 211A of the reinforcing frame 200 with the annular portion 610 (mount guide 630) can be restrained. The annular portion 610, specifically, the mount guide 630, includes a circular through hole 615 through which the bolt 90 is inserted. The through hole 615 has an inside diameter approximately equal to an outer diameter of the flange portion 211A of the reinforcing frame 200, and is fitted on the flange portion 211A.

As shown in FIG. 4, the extending portions 620 extend from the outer circumference of the annular portion 610 toward spaces between the four projections 21A of the shaft 20. That is, four extending portions 620 are provided. Accordingly, four receptacle recesses 650 which receive the projections 21A of the shaft 20 are formed between the extending portions 620. In this way, the spacer 600 is structured to be compact in size by making use of the spaces between the projections 21A of the shaft 20. The extending portions 620 serve to keep a distance between the main frame 100 and the reinforcing frame 200, particularly the distance therebetween near the projections 21A of the shaft 20 which receive a rotary torque, so that the armrest frame RF can be enhanced in rigidity.

The spacer 600 contains plastic or rubber, for example. For example, the spacer may contain fiber in addition to plastic or rubber. Use of the spacer 600 containing plastic or rubber serves to suppress the vibration of the armrest frame RF, so that the vibration noises of the armrest R can be suppressed effectively.

As shown in FIG. 6, the spacer 600 is in contact with the main frame 100 and with the reinforcing frame 200 in the direction of the axis of rotation. To be more specific, the tightening force of the bolt 90 brings the spacer 600 into contact with the main frame 100 and the reinforcing frame 200. The contact of the spacer 600 with the main frame 100 and the reinforcing frame 200 serves to suppress the vibration of the main frame 100 and the reinforcing frame 200, to thereby suppress the vibration noises of the armrest R.

Hereupon, a description will be given of the joining between the main frame 100 and the reinforcing frame 200.

As shown in FIG. 7 and FIG. 8, the main frame 100, if observed in a state before it is joined to the reinforcing frame 200, includes a first extension portion 121 extending from an end of the first sidewall portion 120 leftward, a third extension portion 131 extending from an end of the third sidewall portion 130 leftward, and a fifth extension portion 141 extending from an end of the fifth sidewall portion 140 leftward. Similarly, the reinforcing frame 200, in a state before it is joined to the main frame 100, includes a second extension portion 221 extending from an end of the second sidewall portion 220 leftward, a fourth extension portion 231 extending from an end of the fourth sidewall portion 230 leftward, and a sixth extension portion 241 extending from an end of the sixth sidewall portion 240 leftward.

When the main frame 100 and the reinforcing frame 200 are joined together, first, the reinforcing frame 200 is located inside the main frame 100 in such a manner that the second extension portion 221 lies over a lengthwise inner side of the first extension portion 121, the fourth extension portion 231 lies over a breadthwise inner side of the third extension portion 131, and the sixth extension portion 241 lies over a breadthwise inner side of the fifth extension portion 141, so that the reinforcing frame 200 lies over the inside of the main frame 100. Then, the overlying extension portions 121, 221 are so bent to a lengthwise inner side as to have their distal ends oriented toward the second base portion 210, to thereby form the first joined portion C1. Similarly, the overlying extension portions 131, 231 are so bent to a breadthwise inner side as to have their distal ends oriented toward the second base portion 210, to thereby form the second joined portion C2. Further, the overlying extension portions 141, 241 are so bent to a breadthwise inner side as to have their distal ends oriented toward the second base portion 210, to thereby form the third joined portion C3. In this way, the main frame 100 and the reinforcing frame 200 are joined together at the joined portions C1 to C3.

The joined portions C1 to C3 are bent approximately in the shape of a segment of a circle in cross section, respectively. Accordingly, the distal end portion C11 of the first joined portion C1 (distal end portions of the first folded portion 150 and the second folded portion 250) is located with a gap C12 left between the end portion C11 and the second sidewall portion 220. Similarly, the distal end portion C21 of the second joined portion C2 (distal end portions of the third folded portion 160 and the fourth folded portion 260) is located with a gap C22 between the end portion C21 and the fourth sidewall portion 230, and the distal end portion C31 of the third joined portion C3 (distal end portions of the fifth folded portion 170 and the sixth folded portion 270) is located with a gap C32 between the end portion C31 and the sixth sidewall portion 240. As shown in FIG. 5, the second joined portion C2 and the third joined portion C3 are opposed in the breadthwise direction and aligned with approximately symmetric positions along the breadthwise direction.

A stopper portion 300 configured to be contactable with the bracket 10 of the one-way clutch 1 fixed to the side frame S11 to thereby define the range of rotation of the armrest R is provided in the armrest frame RF. To be more specific, the stopper portion 300 is configured to come in contact with a first rotation restriction portion 11F (see FIG. 3) provided in the bracket 10, thereby restraining the armrest R from rotating downward below Position A, as well as to come in contact with a second rotation restriction portion 11R (see FIG. 3) provided in the bracket 10, thereby restraining the armrest R from rotating rearward beyond Position C.

The stopper portion 300 is provided within an area covered by the bracket 10 when viewed from the left or right side. To be more specific, the stopper portion 300 is provided entirely inside the contour of a base portion 11 of the bracket 10. The stopper portion 300 is provided between the axis RL of rotation and the distal end RA in the lengthwise direction. To be more specific, the stopper portion 300 is provided between the bulging portion 213 and the first bent portion 110D, and between the second joined portion C2 and the third joined portion C3.

As shown in FIG. 7 and FIG. 8, the stopper portion 300 is configured to include a protruding portion 310. The protruding portion 310 is provided protrusively from the armrest frame RF rightward. To be more specific, the protruding portion 310 is provided as a hollow protuberant portion protruding from the second base portion 210 of the reinforcing frame 200 rightward. The protruding portion 310 is inserted through a generally rectangular through hole 320 formed in the first base portion 110 of the main frame 100 and protrudes from the first base portion 110 of the main frame 100 rightward to thereby constitute the stopper portion 300.

Figure 9:
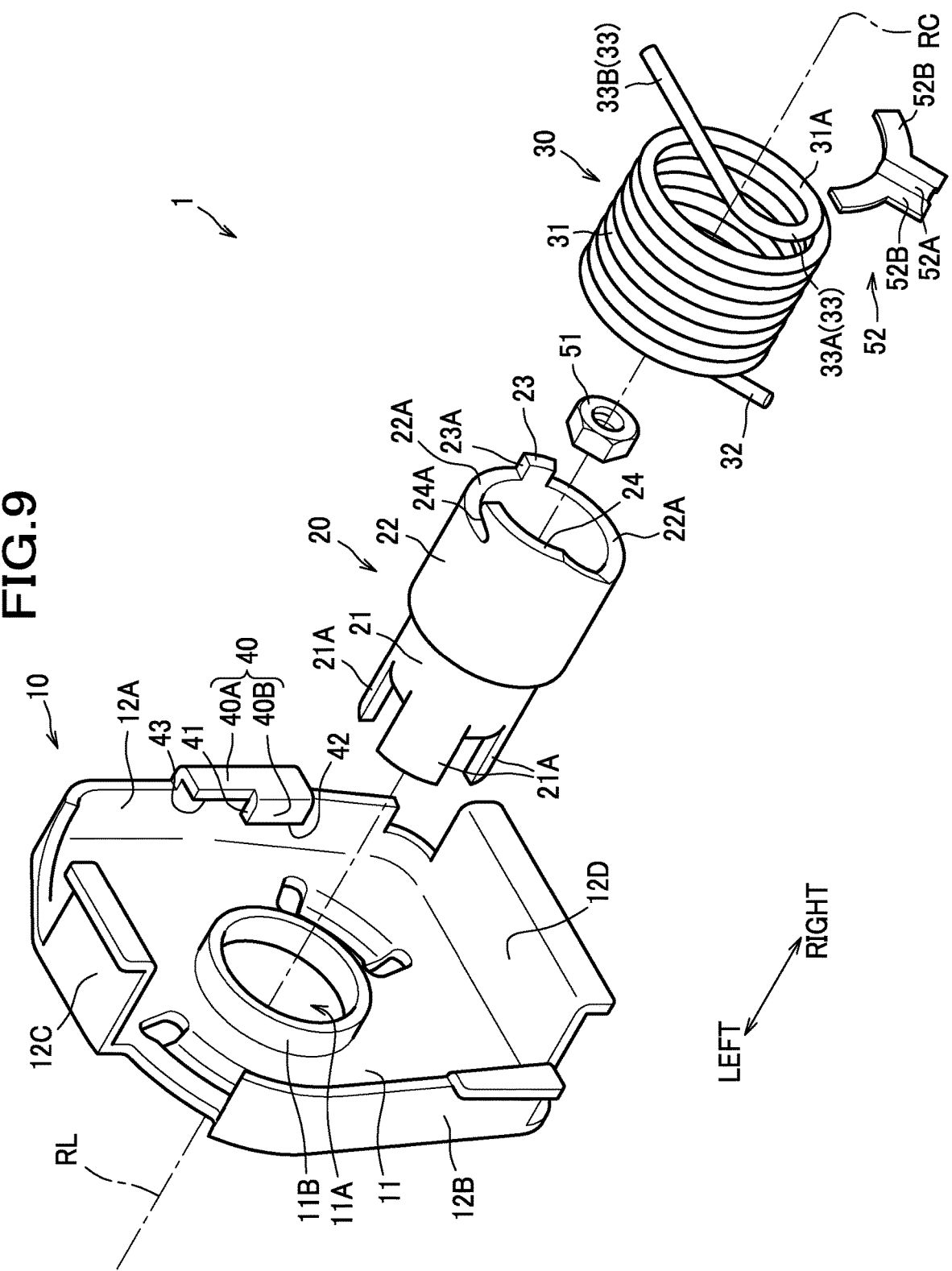
FIG. 9 is an exploded perspective view of the one-way clutch.

The one-way clutch 1 as shown in FIG. 9 is a mechanism for switching the state of the armrest R to a locked state and to an unlocked state, and is provided between the side frame S11 and the armrest R (see FIG. 1). The one-way clutch 1 is configured to restrict the downward rotation of the armrest R and permit the upward rotation of the armrest R in the locked state, and to permit the upward and downward rotations of the armrest R in the unlocked state.

The one-way clutch 1 mainly includes a bracket 10 configured as a support member fixed to the side frame S11, a shaft 20 rotatable relative to the bracket 10, a lock spring 30 fitted and attached onto an outer peripheral surface of the shaft 20, a retaining portion 40, a nut 51 to which the bolt 90 (see FIG. 3) is fastened, and a fixing member 52.

The bracket 10 is a member which is configured to accommodate the shaft 20, the lock spring 30 and other elements and by which the armrest R (armrest frame RF) is rotatably supported; the bracket 10 is disposed between the side frame S11 and the armrest frame RF. The bracket 10 is formed by sheet-metal working of a metal sheet, and mainly includes a base portion 11, and four sidewall portions 12A to 12D extending from the front, rear, upper and lower ends of the base portion 11 rightward.

The base portion 11 is formed approximately in the shape of a rectangular plate, and has formed, approximately in its center, a hole 11A for the shaft 20 to be inserted therethrough. Along the circumferential edge of the hole 11A, a flange portion 11B is formed protrusively rightward by burring or the like. As shown in FIG. 3, the base portion 11 includes a first projection 11C provided protrusively leftward (to the armrest RF side) in a position generally on a front side with respect to the hole 11A, and a second projection 11D provided protrusively leftward in a position generally on a rear side with respect to the hole 11A. When viewed from the left or right side, the first projection 11C and the second projection 11D are located in positions between which the hole 11A is provided, and are each formed generally in the shape of a segment of a circle.

Figure 10:
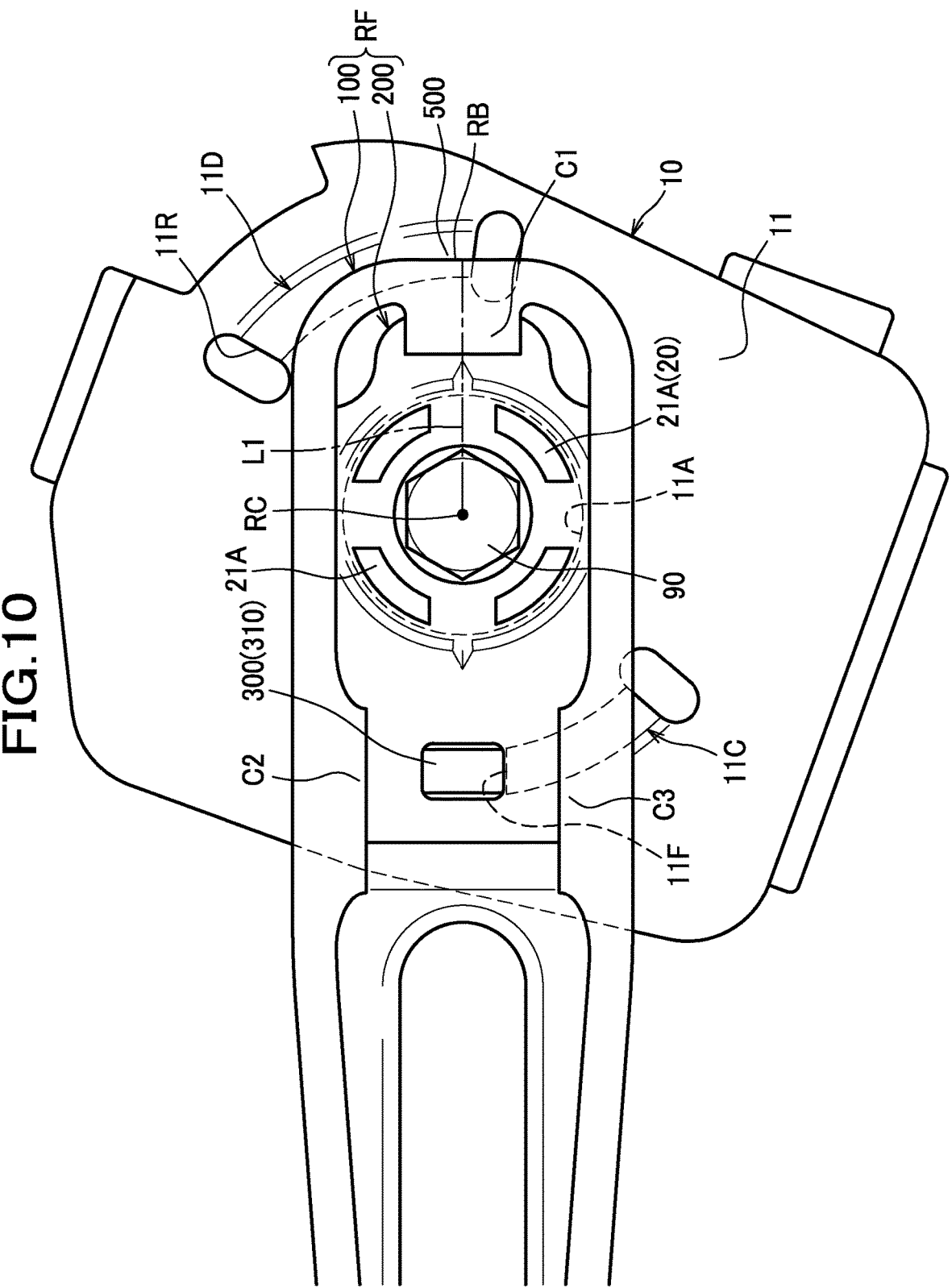
FIG. 10 is an enlarged side view of the base end portion of the armrest frame and the bracket.

As shown in FIG. 10, the first projection 11C has an upper end serving as the first rotation restriction portion 11F configured to be contactable with the stopper portion 300 (protruding portion 310) of the armrest frame RF, thereby restricting the downward rotation of the armrest frame RF. On the other hand the second projection 11D has an upper end serving as the second rotation restriction portion 11R configured to be contactable with the stopper portion 300, thereby restricting the rearward rotation of the armrest frame RF. The second projection 11D includes, at its left side surface facing toward the armrest frame RF in the lateral direction, a deformation restriction portion 500 as a first restriction portion.

The deformation restriction portion 500 is the left side surface of the second projection 11D formed in the bracket 10, and is provided in a portion located on one side of the axis RL of rotation on which the base end RB is located, when an armrest R is in a use position, specifically in a pull-out state (Position A in FIG. 2 (a)). In other words, the deformation restriction portion 500 is provided in a lower end portion of the left side surface of the second projection 11D. The deformation restriction portion 500 is, when the armrest R is in the pull-out state, so located as to overlap a straight line L1 produced between the axis RL of rotation and the base end RB of the armrest frame RF as viewed from the left or right side. Furthermore, the deformation restriction portion 500 is, when the armrest R is in the pull-out state, so located as to overlap the base end RB of the armrest frame RF as viewed from the left or right side.

The second projection 11D has an upper side portion including the second rotation restriction portion 11R and a lower portion including the deformation restriction portion 500, which upper and lower side portions are connected together in a circumferential direction of the hole 11A, so that the second projection 11D is formed approximately in the shape of a segment of a circle. Accordingly, the deformation restriction portion 500 and the second rotation restriction portion 11R are formed as a continuous series of projections. In the present embodiment, the second rotation restriction portion 11R corresponds to "second restriction portion".

As shown in FIG. 9, the sidewall portions 12A to 12D are formed to cover the shaft 20, the lock spring 30 and the like from the front, rear, upper and lower sides. The rear, upper and lower sidewall portions 12B to 12D have their right side end portions welded or otherwise fixed to the side frame S11, whereby the bracket 10 is fixed to the side frame S11. That is to say, it is also to be understood that the bracket 10 is a member by which the armrest frame RF rotatably supported by the bracket 10 is attached to the seat frame SF as a frame of the seat.

The shaft 20 is an approximately tubular member made of metal, including a left-side first portion 21 and a right-side second portion 22, wherein the first portion 21 is slightly smaller in outer diameter than the second portion 22 and is thus insertable through the hole 11A of the bracket 10. At the left-side end portion of the first portion 21 in the axial direction of the lock spring 30 (i.e., the direction of extension of the axis RL of rotation), a plurality of (specifically, four) projections 21A protruding toward the armrest frame RF are provided. These four projections 21A are each formed approximately in the shape of a segment of a circle of which a center coincides with the axis RL of rotation, and are arranged equidistantly in positions corresponding to the through holes 112 and the engageable holes 212 of the armrest frame RF (see FIG. 4) along a circumference of a circle of which a center coincides with the axis RL of rotation.

Further, portions of the left-side end portion of the first portion 21 between the projections 21A are, as shown in FIG. 6, each bent inwardly along the radii of the shaft 20 at an angle of approximately 90 degrees to provide a plurality of bent portions 21B. The nut 51 is disposed inside the shaft 20, and the nut 51 is welded or otherwise joined to the plurality of bent portions 21B.

The four projections 21A (see FIG. 4) of the shaft 20 are inserted through the corresponding through holes 410 formed in a washer 400, the corresponding through holes 112 formed in the main frame 100, and the corresponding receptacle recesses 650 of the spacer 600, and are engaged in the corresponding engageable holes 212 formed in the reinforcing frame 200. The bolt 90 is inserted through the insertion hole 211 of the reinforcing frame 200, the through hole 615 of the spacer 600, the insertion hole 111 of the main frame 100, and the washer 400, and fastened to nut 51, so that the shaft 20 is fixed to the armrest frame RF (armrest R). Accordingly, the armrest frame RF and the shaft 20 are integrally rotatable with respect to the bracket 10. Although not illustrated in the drawings, the through holes 410 of the washer 400 are, similar to the through holes 112 and the engageable holes 212, each formed approximately in the shape of a segment of a circle, and arranged approximately equidistantly along a circumference of a circle of which a center coincides with the axis RL of rotation.

The second portion 22 has a left end face 22B contactable with an end portion of the flange portion 11B. With this feature, the armrest RF can be prevented from getting detached from the bracket 10 leftward. As shown in FIG. 9, the second portion has a right end face 22A provided with an action portion 23 protruding from the end face 22A and a cam portion 24.

The action portion 23 includes a pressing surface 23A which presses a free end portion 33 (described later) of the lock spring 30 in the circumferential direction of the shaft 20 to thereby radially enlarge the lock spring 30. The pressing surface 23A is a flat surface extending along the axial direction of the lock spring 30 and approximately perpendicular to the circumferential direction of the lock spring 30.

The cam portion 24 is formed to protrude from the end face 22A of the shaft 20 beyond the action portion 23, and located apart from the pressing surface 23A of the action portion 23 in the circumferential direction of the shaft 20. The cam portion 24 has, at its side facing to the pressing surface 23A in the circumferential direction, a cam surface 24A so inclined as to get closer to the pressing surface 23A with increasing distance from the end face 22A of the shaft 20.

The lock spring 30 is a coil spring made of metal, and is, once fitted on the outer peripheral surface of the shaft 20, disposed between the base portion 11 of the bracket 10 and the side frame S11. The lock spring 30 includes a coiled portion 31 to be fitted on the outer peripheral surface of the shaft 20, a fixed end portion 32 to be fixed to the bracket 20 by the fixing member 52, and a free end portion 33 not to be fixed to the bracket 10.

The coiled portion 31 extending spirally from the fixed end portion 32 toward the free end portion 33 is wound around in the direction of downward rotation of the armrest R. With this configuration, the lock spring 30 in the locked state serves to restrict the downward rotation of the armrest R because the coiled portion 31 is wound tightly around the shaft 20. On the other hand, the upward rotation of the armrest R in the locked state is permitted because the coiled portion 31 is made wound loosely by the frictional force between the shaft 20 and the coiled portion 31.

The fixed end portion 32 extends from the left end of the coiled portion 31 in the radially outward direction of the coiled portion 31. The fixing member 52 is formed by sheet-metal working of a metal sheet, and includes an engageable portion 52A having an approximately U-shaped cross section and configured to be engageable with the fixed end portion 32, and fixing portions 52B between which the engageable portion 52A is provided. The fixed end portion 32 is engaged with the engageable portion 52A from its right side, and the fixing portions 52B is welded or otherwise fixed to the right-side surface of the base portion 11, whereby the fixed end portion 32 is fixed on the bracket 10.

Figure 12:
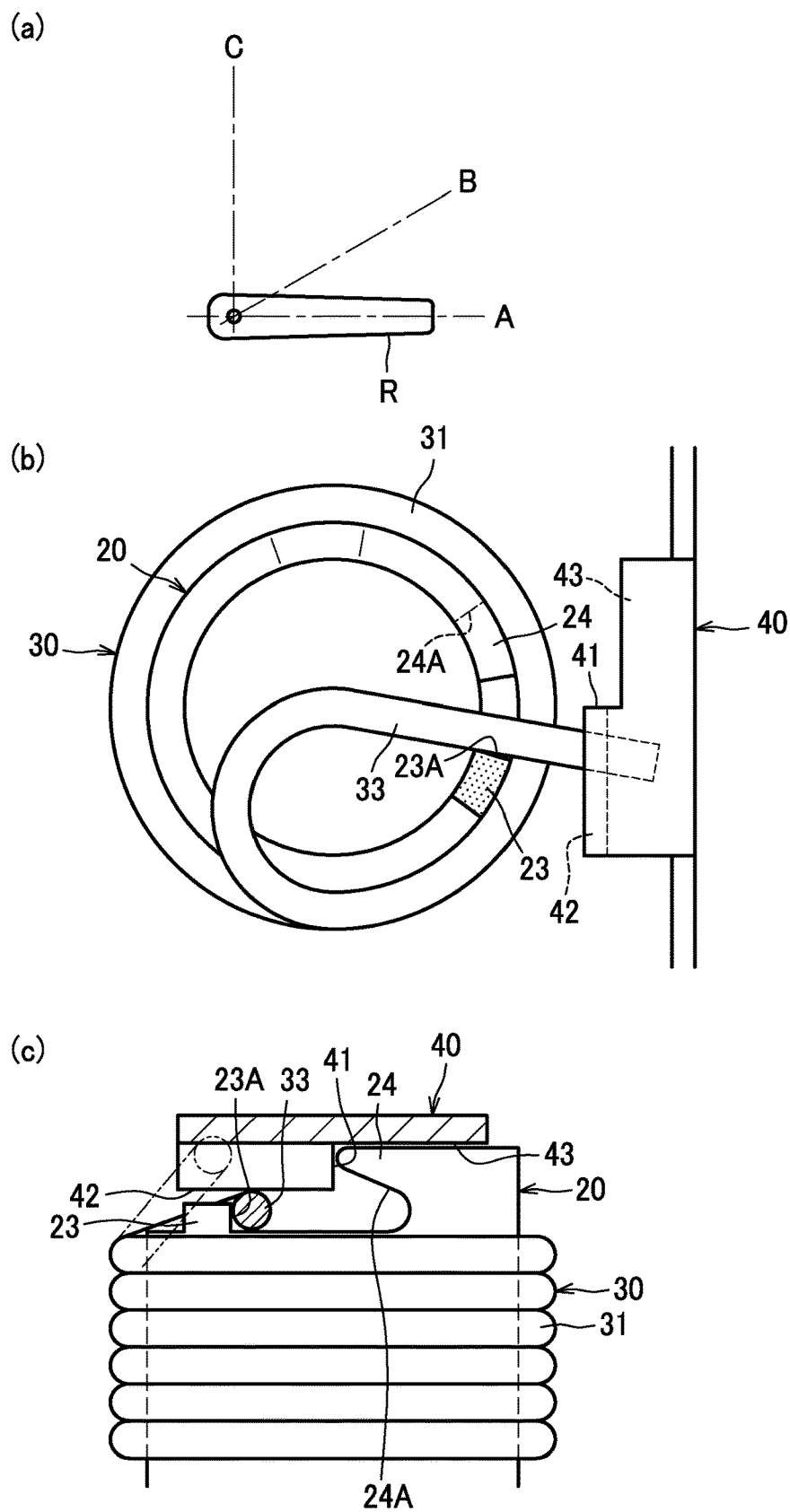
FIG. 12 includes views (a) to (c) showing the states of respective members when the armrest is in a pull-out state.

The free end portion 33 includes a bent portion 33A curved in an approximately semicircular shape from the right end 31A of the coiled portion 31 radially inward, and a to-be-pressed portion 33B extending approximately straight from the bent portion 33A radially outward. In a natural state where the free end portion 33 is not engaged with the retaining portion 40, the free end portion 33 extending from the end 31A of the coiled portion 31 toward the distal end is angled away from the coiled portion 31, while once the free end portion 33 is engaged with the retaining portion 40, the deflection as thus effected causes the to-be-pressed portion 33B to be shifted slightly toward the coiled portion 31 (see FIG. 12(c)).

Figure 11:
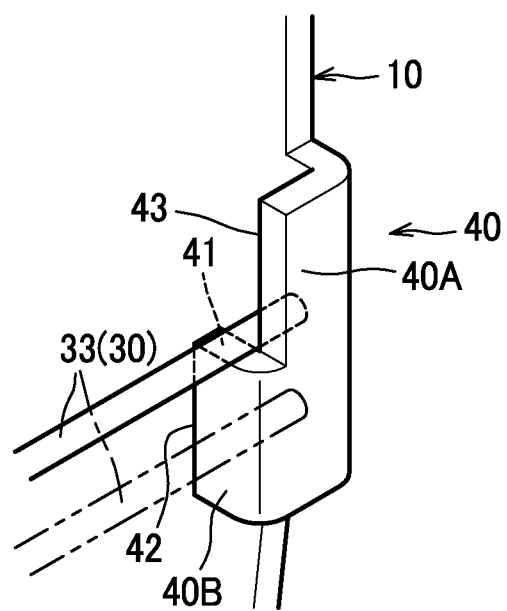
FIG. 11 is an enlarged perspective view of a retaining portion.

The retaining portion 40 is provided in the front sidewall portion 12A of the bracket 10. To be more specific, the retaining portion 40 is formed integrally with the bracket 10 by bending a portion (generally at the center in the upward-downward direction) of a right-side end portion of the sidewall portion 12A rearward and leftward. The retaining portion 40 mainly includes a first portion 40A extending from a right end of the sidewall portion 12A rearward, and a second portion 40B extending from a lower portion of the rear end of the first portion 40A leftward. As shown in FIG. 11, the retaining portion 40 has a first retaining surface 41, a second retaining surface 42 and a third retaining surface 43 formed thereon which are engageable with the free end portion 33 of the lock spring 30.

The first retaining surface 41 is an upper-side surface of the second portion 40B, and serves to keep the lock spring 30 greater in diameter in the unlocked state than in the locked state by getting engaged with the free end portion 33 of the lock spring 30 in the circumferential direction of the coiled portion 31 (not shown). The first retaining surface 41 is shaped as a flat surface approximately parallel to the axial direction of the lock spring 30.

The second retaining surface 42 is a left-side surface of the second portion 40B, and is configured to face in the axial direction of the lock spring 30 on, get in contact with, and keep the free end portion 33 deflected and shifted in the axial direction (specifically, leftward) in the locked state relative to the state in which the free end portion 33 is engaged with the first retaining surface 41. The second retaining surface 42 extends from a left-side end of the first retaining surface 41 downward, and is shaped as a flat surface approximately perpendicular to the axial direction of the lock spring 30.

The third retaining surface 43 is an upper region of the left-side surface of the first portion 40A located above the first retaining surface 41, and is configured to face in the axial direction of the lock spring 30 on, and get in contact with the free end portion 33 in the unlocked state. The third retaining surface 43 is, similar to the second retaining surface 42, shaped as a flat surface approximately perpendicular to the axial direction of the lock spring 30.

Next, a description will be given of an operation of the one-way clutch 1. In FIG. 12 to FIG. 17 to which reference will be made, (a) is a view showing a position of the armrest R, (b) is a view showing the shaft 20, the lock spring 30 and the retaining portion 40 as viewed from the right side, and (c) is a view showing the shaft 20, the lock spring 30 and the retaining portion 40 as viewed from the front side. In the views (b), the action portion 23 is hatched with dots.

As shown in FIGS. 12(a) to (b), where the armrest R is illustrated in the pull-out state (Position A), the free end portion 33 of the lock spring 30 is retained by the second retaining surface 42 of the retaining portion 40, so that the free end portion 33 is kept deflected inwardly in the axial direction of the lock spring relative to the natural state (see chain double-dashed lines).

Then, referring to FIGS. 13(a) to (c), when the armrest R is turned upward from Position A toward Position B, the shaft 20 rotates counterclockwise as in the drawing. Thus, the pressing surface 23A of the action portion 23 provided in the shaft 20 comes in contact with the free end portion 33 of the lock spring 30, and pushes the free end portion 33 in the circumferential direction. Accordingly, the free end portion 33 of the lock spring 30 slides on the second retaining surface 42 and moves in a direction toward the first retaining surface 41; this gradually makes the coiled portion 31 loose, and causes the lock spring 30 to expand in diameter.

Thereafter, when the armrest R is turned to Position B as shown in FIGS. 14(a) to (c), the free end portion 33 comes off the second retaining surface 42. Then, the free end portion 33 is restored from the deflected state to the extent that it comes in contact with the third retaining surface 43, with the result that the free end portion 33 comes off the pressing surface 23A. Then, the free end portion 33 is pressed against the first retaining surface 41 with a resilient force of the coiled portion 31 so strained as would tighten the shaft 20, and is engaged with the first retaining surface 41 in the circumferential direction of the coiled portion 31. Accordingly, the lock spring 30 is retained in a state such that the coiled portion 31 is enlarged in diameter in comparison with the state in which the lock spring 30 is in the locked state. In this way, rotation of the armrest R from Position A to Position B causes the armrest R to change its state from the locked state to the unlocked state.

Thereafter, when the armrest R is turned from Position B to Position C as shown in FIGS. 15(a) to (c), the action portion 23 rotates counterclockwise as in the drawings according as the shaft 20 rotates, passing on an inner side of the free end portion 33 in the axial direction (under the free end portion 33 as in FIG. 15(c)), and moves to a position downstream, in the counterclockwise direction as in the drawings, of the free end portion 33. In this state, where the free end portion 33 remain engaged with the first retaining surface 41, the coiled portion 31 is retained in an enlarged state, and thus the unlocked state remains unchanged. Similarly, when the armrest R is turned from Position C to a position short of Position A, the free end portion 33 remains engaged with the first retaining surface 41, and thus the unlocked state remains unchanged.

When the armrest R is turned from Position C to a position short of Position A as shown in FIGS. 16(a) to (c), the shaft 20 rotates clockwise as in the drawings, and the cam surface 24A of the cam portion 24 provided in the shaft 20 is brought into contact with the free end portion 33. Subsequently, when the armrest R is turned from the position short of Position A to Position A as shown in FIGS. 17(a) to (c), the free end portion 33 pushed inward in the axial direction by the cam surface 24A and thus deflected to move inward in the axial direction comes off the first retaining surface 41.

When the free end portion 33 comes off the first retaining surface 41, the resilient force of the coiled portion 31 so strained as to tighten the shaft 20 causes the free end portion 33 to slide on the second retaining surface 42 and move in a direction away from the first retaining surface 41, as shown in FIGS. 12(a) to (c); accordingly, the coiled portion 31 tightens the shaft 20. In this way, the state of the armrest R is changed from the unlocked state to the locked state.

Next, a description will be given of the workings and advantageous effects achieved when a large load is imposed on the armrest R in the pull-out state (use position) from a laterally inner side.

Figure 18:
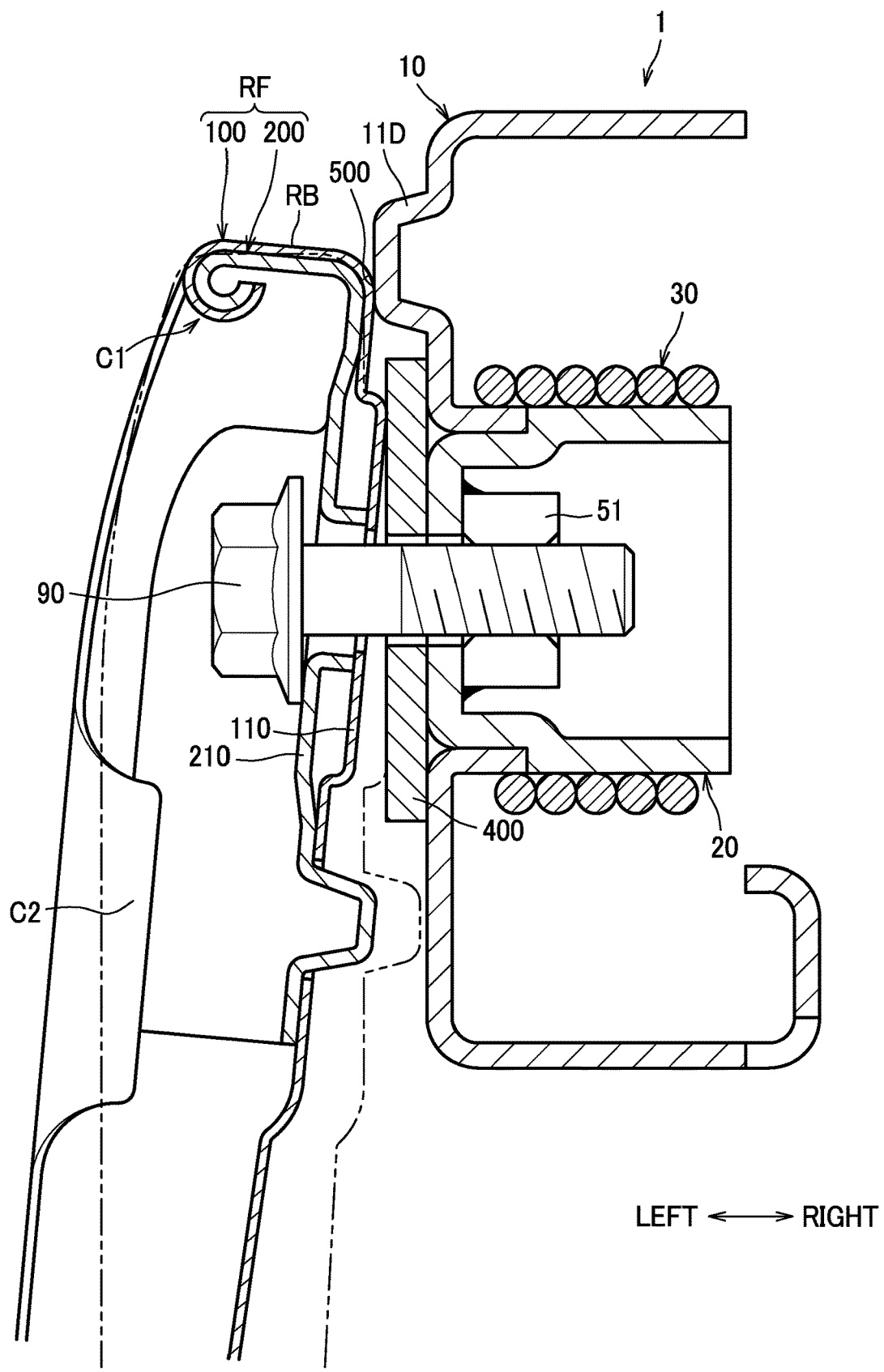
FIG. 18 is a view showing the action exerted when a large load is placed on the armrest in a use position from a laterally inner side.

If the distal end portion of the armrest R in the pull-out state as shown in FIG. 1 receives a large load from a laterally inner side of the car seat S, the armrest frame RF is caused to rotate clockwise as seen in the drawing around the fastened portion at which the armrest frame RF is fastened to the bracket 10 by the bolt 90, as shown in FIG. 18, so that the portion of the armrest frame RF on the distal end RA side with respect to the bolt 90 tends to deform toward the laterally outer side while the portion of the armrest frame RF on the base end RB side with respect to the bolt 90 tends to deform toward the laterally inner side. Then, the base end portion of the armrest frame RF comes in contact with the deformation restriction portion 500 provided in the bracket 10. Accordingly, deformation of the base end portion of the armrest frame RF toward the laterally inner side beyond this state is restricted, and deformation of the distal end portion of the armrest frame RF toward the laterally outer side beyond this state is restricted; therefore, such an excessive deformation as to result in bending of the armrest frame RF to the laterally outer side of the car seat S can be restricted.

In the present embodiment, the base end portion of the armrest frame RF and the deformation restriction 500 of the bracket 10 are brought into contact with each other on a straight line L1 produced between the axis RL of rotation and the base end RB of the armrest frame RF (see FIG. 10); therefore, the armrest frame RF can be restrained from getting unsteady sideways. With this arrangement, the base end portion of the armrest frame RF can be supported stably by the deformation restriction portion 500, and an excessive deformation of the armrest frame RF can be suppressed effectively by the deformation restriction portion 500.

Furthermore, in the present embodiment, a portion closer to the base end RB of the armrest frame RF, in other words, a portion farther from the bolt 90 in the base end portion of the armrest frame RF comes in contact with the deformation restriction portion 500 provided in the bracket 10; therefore, a force received by the deformation restriction portion 500 from the base end portion of the armrest frame RF can be as small as possible, so that an excessive deformation of the deformation restriction portion 500 itself can be suppressed effectively. Accordingly, the base end portion of the armrest frame RF can be supported firmly by the deformation restriction portion 500, so that an excessive deformation of the armrest frame RF can be suppressed effectively by the deformation restriction portion 500.

Furthermore, in the present embodiment, portions of the main frame 100 and the reinforcing frame 200 closer to the base end RB are joined at the first joined portion C1; therefore, the base end portion of the main frame 100 and the reinforcing frame 200 can be made unlikely to separate from each other, with the result that the rigidity of the armrest frame RF can be improved. Even if the armrest R in the pull-out state receives from a laterally inner side a large load which would cause the distal end RA side portion of the main frame 100 to deform toward a laterally outer side, and cause the base end portion RB side portion of the main frame 100 to deform toward a laterally inner side away from the reinforcing frame 200, the first joined portion C1 at which the main frame 100 and the reinforcing frame 200 are joined together allows the reinforcing frame 200 to reinforce the main frame 100. Accordingly, the base end portion of the main frame 100 can be restrained from further deforming toward the laterally inner side, and the distal end portion of the main frame 100 can resultantly be restrained from further deforming toward the laterally outer side; in totality, an excessive deformation of the main frame 100 can be suppressed effectively. This advantageous effect is noticeable particularly in cases where the main frame 100 has a thickness reduced in order to achieve light weight of the armrest frame RF.

According to the present embodiment as described above, the following further advantageous effects can be achieved.

Since the armrest frame RF includes the main frame 100 and the reinforcing frame 200 that has a thickness greater than a thickness of the main frame 100 and is so located as to lie over the base end portion of the main frame 100, a portion of the armrest frame RF at the base end RB side can be provided with high rigidity by the reinforcing frame 200. On the other hand, the main frame 100 can be made thinner in thickness and lighter in weight, with the result that the weight reduction of the armrest frame RF as a whole can be achieved. Moreover, since the shaft 20 is fixed to the reinforcing frame 200 of the armrest frame RF, the portion of the armrest frame RF around the shaft 20 (around the axis) can be of a rigidity enhanced by the reinforcing frame 200. In addition to the light weight feature of the armrest frame RF in its entirety achieved by reduction in thickness of the main frame 100, provision of the one-way clutch 1 in the side frame S11 not in the armrest R also serves to reduce the weight of the armrest R as a whole.

Since a mechanism, such as the one-way clutch 1, for switching between the locked state and the unlocked state is not provided in the armrest R, it is possible to obviate the necessity for a part for protecting the mechanism (e.g., plastic cover disclosed in WO 2014/024709 A1, or the like) which would be required to prevent foamed plastic as injected under an outer covering with which the armrest frame RF is covered, from flowing into the mechanism. This contributes to reduction in the number of parts of the armrest R.

Since the projections 21A of the shaft 20 engageable with the engageable holes 212 provided in the reinforcing frame 200 are disposed through the through holes 112 provided in the main frame 100 as shown in FIG. 4, the positions of the main frame 100 and the reinforcing frame 200 can be determined. This may improve the workability of assembly of the armrest R. The through holes 112 and the engageable holes 212 are arranged in a plurality of positions along the circumference of a circle of which the center coincides with the axis RL of rotation, the positions of the main frame 100 and the reinforcing frame 200 can be determined appropriately. This may further improve the workability of assembly of the armrest R.

Since the bulging portion 213 is formed in the reinforcing frame 200 and the reinforcing portions 213C are formed at both sides of the lengthwise extremities of the bulging portion 213, the rigidity of the portion of the armrest frame RF around the shaft 20 can be further increased. Since the bulging portion 115 is formed in the main frame 100 as shown in FIG. 5, the rigidity of the main frame 100 itself can be increased.

Since the reinforcing frame 200 includes a portion at which the reinforcing frame 200 and the main frame 100 face toward each other in the direction of the axis of rotation and part of which is separate from the main frame 100, a wider portion is formed in the direction of the axis of rotation so that the enhanced rigidity and weight reduction of the armrest R can be achieved. In particular, since the distance D between the part of the reinforcing frame 200 and the main frame 100 is great, the rigidity of the armrest frame RF can be increased.

Since the spacer 600 is provided on the portion of the reinforcing frame 200 separated from the main frame 100 between the main frame 100 and the reinforcing frame 200, the distance between the main frame 100 and the reinforcing frame 200 is retained when the bolt 90 is tightened to fasten the armrest R to the shaft 20, so that the rigidity of the armrest frame RF can be increased.

Since the spacer 600 has the through hole 615 through which the bolt 90 is inserted, the spacer 600 can receive the tightening force of the bolt 90 around the through hole 615, and the distance between the main frame 100 and the reinforcing frame 200 can be retained and the rigidity of the armrest frame RF can be increased.

Since the reinforcing frame 200 and the main frame 100 are joined together at the first joined portion C1 that is formed of the overlying portions of the first folded portion 150 and the second folded portion 250 as shown in FIG. 7, the main frame 100 and the reinforcing frame 200 can be joined together without welding or the like, so that the rigidity of the armrest frame RF can be increased. The same applies to the second joined portion C2 and the third joined portion C3.

Since the distal end portion C11 of the first joined portion C1 is located with the gap C12 left between the end portion C11 and the second sidewall portion 220, the rigidity of the armrest frame RF can be increased in comparison with an alternative configuration in which the folded portions 150, 250 are folded to such an extent as to come in contact with the second sidewall portion 220. Moreover, the presence of the gap C12 allow foamed plastic to be injected also in the gap C12 when the armrest frame RF is covered with the outer covering and foamed plastic is injected thereunder to form the armrest R. With this feature, displacement of the padding formed by solidified plastic foam can be suppressed. The same applies to the second joined portion C2 and the third joined portion C3.

Since the reinforcing frame 200 and the main frame 100 are joined together at the second joined portion C2 and the third joined portion C3, and the second joined portion C2 and the third joined portion C3 are provided in positions opposed in the breadthwise direction as shown in FIG. 8, the main frame 100 and the reinforcing frame 200 can be firmly joined together. With this feature, the rigidity of the armrest frame RF can be increased further. If the armrest R in the pull-out state receives a large load from a laterally inner side, then the distal end RA side portion of the main frame 100 tends to deform laterally outward; however, since that portion which tends to get separated from the reinforcing frame 200 are joined thereto at the joined portions C2, C3, the main frame 100 can be reinforced by the reinforcing frame 200. Accordingly, further laterally outward deformation of the distal end portion of the main frame 100 can be suppressed, with the result that excessive deformation of the main frame 100 can be suppressed effectively.

Since the stopper portion 300 is provided between the second joined portion C2 and the third joined portion C3, the stopper portion 300 can be located in a space-saving manner. Accordingly, the armrest R can be miniaturized. Since the stopper portion 300 is disposed between the second joined portion C2 and the third joined portion C3 which are opposed in the breadthwise direction and at which the main frame 100 and the reinforcing frame 200 are joined together, the displacement of the main frame 100 and the reinforcing frame 200 with respect to each other which would be caused by a force imposed on the stopper portion 300 can be suppressed.

Since the protruding portion 310 that constitutes the stopper portion 300 is provided in the reinforcing portion 200, the rigidity of the protruding portion 310 can be increased in comparison with an alternative configuration in which such a protruding portion is provided in the main frame 100. Since the stopper portion 300 can be constructed by the reinforcing frame 200 having a thickness thicker than a thickness of the main frame 100, the rotation of the armrest R can be restricted stably even when a large force in the direction of rotation is exerted on the armrest R; therefore, the rigid feel provided when an arm is rested on the armrest R can be increased. Since the force imposed on the stopper portion 300 can be received by the reinforcing frame 200, the main frame 100 may be constructed to be thinner in thickness. Accordingly, the weight of the armrest R can be reduced. Since the protruding portion 310 is disposed through the through hole 320 and protrudes on the bracket 10 side, the assembly of the main frame 100 and the reinforcing frame 200 can be performed through the step of engaging the protruding portion 310 of the reinforcing frame 200 in the through hole 320 of the main frame 100, so that the reinforcing frame 200 can be located in place relative to the main frame 100.

Since the deformation restriction portion 500 and the second rotation restriction portion 11R are formed continuously as the second projection 11D as shown in FIG. 3, the bracket 10 can be configured to be simple in structure in comparison with an alternative configuration in which the deformation restriction portion 500 and the second rotation restriction portion 11R are formed as separate projections. The deformation restriction portion and the second rotation restriction portion may be provided by attaching block-shaped members or the like configured as separate members to the base portion 11 of the bracket 10; in this configuration, the deformation restriction portion and the second rotation restriction portion may be formed as a continuous projection (formed in one piece), so that the number of parts which constitute the bracket 10 can be reduced.

Since the stopper portion 300 is provided between the axis RL of rotation and the distal end RA as shown in FIG. 5, a distance from the stopper portion 300 to the distal end RA can be made shorter than a distance from the axis RL of rotation to the distal end RA. Accordingly, the armrest frame RF is made unlikely to bend even if a force is imposed on the armrest R in the state where the range of rotation of the armrest R is restricted by the stopper portion 300, so that the rigid feel provided when an arm is rested on the armrest R can be increased. Since the required rigidity is made smaller, the thickness of the main frame 100 can be made thinner, and the weight of the armrest R can be made much lighter.

Since the main frame 100 has a plurality of lightening holes 114, the weight of the armrest R can be reduced further. Since no lightening hole 114 is provided in a portion of the main frame 100 on which the reinforcing frame 200 is provided, the rigidity of the armrest frame FR around the shaft 20 can be increased. Since the lightening holes 114 are formed in positions other than the bent portion of the first base portion 110 between the first portion 110A and the second portion 110B (first bent portion 110D) and the bent portion of the first base portion 110 between the second portion 110B and the third portion 110C (second bent portion 110E), the armrest frame RF can be made lighter in weight and higher in rigidity.

Since the retaining portion 40 by which the lock spring 30 is retained in a radially expanded state is provided in the bracket 10 fixed to the side frame S11 as shown in FIG. 9, the number of parts of the one-way clutch 1 can be reduced in comparison with an alternative configuration in which the retaining portion is provided in any member other than the bracket. Since the retaining portion 40 is provided integrally with the bracket 10, the number of parts of the one-way clutch 1 can be reduced further in comparison with an alternative configuration in which a retaining portion formed as a separate part is attached to the bracket.

Since the nut 51 is disposed inside the shaft 20 as shown in FIG. 6, the one-way clutch 1 can be miniaturized in comparison with an alternative configuration in which a nut is disposed outside the shaft. Since the nut 51 is joined to the bent portions 21B formed by partially bending the end portions of the shaft 20 inwardly, a part for joining the nut 51 to the shaft 20 can be omitted. Accordingly, the number of parts of the one-way clutch 1 can be reduced.

Although one illustrative embodiment of the present invention has been described above, the present invention is not limited to the above-described embodiment. Specific configurations can be changed where appropriate without departing from the gist of the present invention as will be described below.

For example, although the fixed end portion 32 of the lock spring 30 is fixed to the bracket 10 by the fixing member 52 in the above-described embodiment, the fixed end portion 32 may be fixed to the bracket 10 by being engaged in a recessed portion formed in the base portion 11 of the bracket 10. Alternatively, the fixed end portion 32 may be fixed to the bracket 10 by welding.

Although the stopper portion 300 in the above-described embodiment is formed of the protruding portion 310 provided in the reinforcing frame 200 and disposed though the through hole 320 provided in the main frame 100 and protruding from the main frame 100, the stopper portion is not limited to this specific example. For example, to elaborate with reference made to FIG. 8, the stopper portion 300 may have a double-wall structure with a rightward-protruding first protruding portion 310 provided in the reinforcing frame 200 and a rightward-protruding hollow second protruding portion provided in the main frame 100, the first protruding portion 310 being engaged with the recessed portion formed at the back of the second protruding portion. Such a stopper portion 300 may be formed for example with the main frame 100 and the reinforcing frame 200 overlaid one on another and joined together, and then subjected to a drawing process. As this configuration serves to increase the rigidity of the stopper portion 300, the rotation of the armrest R can be restricted stably, and the rigid feel provided when an arm is rested on the armrest R can be increased. Although the stopper portion 300 in the above-described embodiment is formed integrally with the armrest frame RF, the stopper portion may be configured as a member provided separate from the armrest frame RF and attached to the armrest frame RF.

Although the retaining portion 40 in the above-described embodiment is formed integrally with the bracket 10, a retaining portion configured as a member provided separate from the bracket 10 may be attached to the bracket 10.

Although the shaft 20 and the reinforcing frame 200 are fixed by fastening of the nut 51 and the bolt 90 in the above-described embodiment, the shaft and the reinforcing frame may be fixed for example by welding or the like.

Although the deformation restriction portion 500 as the first restriction portion and the second rotation restriction portion 11R as the second restriction portion are formed continuously as the second projection 11D in the above-described embodiment, the first restriction portion and the second restriction portion may be formed as separate projections.

Although the deformation restriction portion 500 as the first restriction portion is so located as to overlap the base end RB of the armrest frame RF in the above-described embodiment, the first restriction portion may, for example, be so located as not to overlap the base end of the armrest frame but to overlap only a portion of the armrest frame between the axis of rotation and the base end.

Although the deformation restriction portion 500 as the first restriction portion in the above-described embodiment is so located as to overlap a straight line L1 produced between the axis RL of rotation and the base end RB of the armrest frame RF, this is not a prerequisite. For example, to elaborate with reference made to FIG. 10, the first restriction portion may be located in two positions across the line L1 one above the line L1 and the other below the line L1. Furthermore, the first restriction portion may be located in three or more positions.

Although the use position of the armrest R in the above-described embodiment is illustrated to be Position A (pull-out state) in FIG. 2 (a), this is not a prerequisite. For example, the use position may be a range from Position A to Position B in FIG. 2(a) within which the armrest subjected to a fold-away operation and caused to move from the pull-out state to the fold-away state is in the locked state and restrained from turning downward by the one-way clutch 1. In other words, the first restriction portion may be so provided as to come in contact with the armrest frame when the armrest located in the range from Position A to Position B receives a large load from a laterally inner side. For example, to elaborate with reference made to FIG. 10, the second projection 11D including the deformation restriction portion 500 as the first restriction portion may have a lower portion elongated in the circumferential direction of the hole 11A to be longer than the arrangement shown in FIG. 10. Alternatively, the second projection 11D may be connected to the first projection 11C below the axis RL of rotation to form an integral projection with the first projection 11C.

Although the deformation restriction portion 500 as the first restriction portion in the above-described embodiment is provided in the bracket 10, this is not a prerequisite. For example, the first restriction portion may not be provided in the bracket but be provided in the armrest frame. To be more specific, the first restriction portion may be provided protrusively toward the bracket in a portion at which the armrest frame and the bracket face toward each other in the lateral direction and which is located closer to the base end than the axis of rotation. Alternatively, the first restriction portion may be provided in both of the armrest frame and the bracket.

Although the main frame 100 and the reinforcing frame 200 in the above-described embodiment are joined together at the overlying portions of the folded portions 150, 250, i.e., the first joined portion C1, the main frame and the reinforcing frame may, for example, be joined together by welding or be joined together by fastening of the bolt and the nut. The same applies to the second joined portion C2 and the third joined portion C3.

Although the reinforcing frame 200 in the above-described embodiment is located on a side of the main frame 100 which is opposite to another side of the main frame 100 on which the bracket 10 is located, the reinforcing frame may be located between the main frame and the bracket.

Although the armrest frame RF in the above-described embodiment is of two-part construction including the main frame 100 and the reinforcing frame 200, the armrest frame may be composed of one part, or may be composed of three or more parts.

Although the bracket 10 for attaching the armrest frame RF to a frame of the seat is illustrated as the support member in the above-described embodiment, the support member may be, for example, the side frame S11 or other part which constitutes the frame of the seat. One example of such a support member may be formed by cutting and raising a portion of the side frame S11 to form the shape like the bracket 10 in the above-described embodiment.

Figure 19:
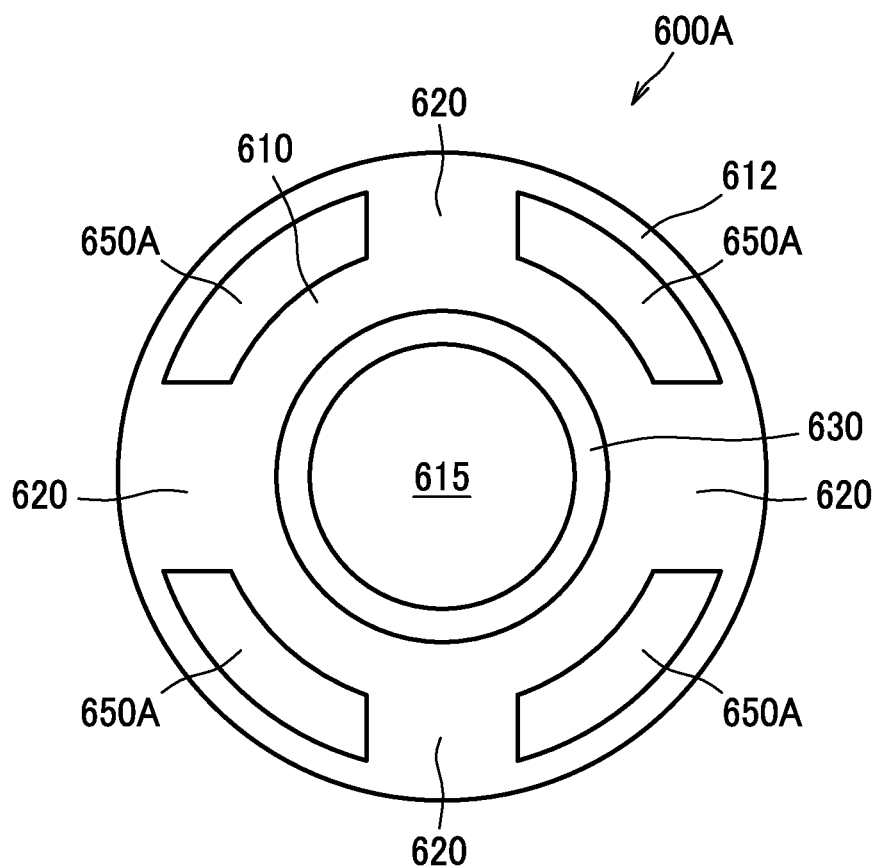
FIG. 19 is a view showing a modified example of a spacer.

A second ring portion 612 may be provided outside of the extending portions 620 to connect the extending portions 620 as in a spacer 600A shown in FIG. 19. That is, although the spacer 600 in the above-described embodiment has receptacle recesses 650 which allow the projections 21A of the shaft 20 to be disposed therein, the portions receiving the projections 21A may be receptacle holes 650A.

In the above-described embodiment, the car seat S installed in an automobile is illustrated as a seat in which the armrest R and the one-way clutch 1 are provided; however, the seat may be a vehicle seat installed in a vehicle other than an automobile, for example, in a railcar, ship, aircraft, etc. Furthermore, the seat may not be limited to the vehicle seat, but, may be a seat for use in households or the like, for example.

Any of the elements explained in relation to the above-described embodiments and modified examples may be implemented in combination as desired.

The invention claimed is:

1. An armrest device comprising:
an armrest frame; and
a support member by which the armrest frame is rotatably supported,
wherein the armrest frame has, at lengthwise extremities thereof, a base end closer to an axis of rotation and a distal end farther from the axis of rotation,
wherein the support member includes a first restriction portion provided protrusively toward the armrest frame, the first restriction portion being a portion at which the armrest frame and the support member face toward each other in a direction of the axis of rotation of the armrest frame and that is located on one side of the axis of rotation on which the base end is located, when an armrest is in a use position,
wherein the armrest frame includes a first protruding portion provided protrusively toward the support member, the first protruding portion having an inner surface facing the support member, a center of the first protruding portion in a lengthwise direction of the armrest frame being located on the axis of rotation,
wherein the first restriction portion is located farther from the axis of rotation than the first protruding portion, and
wherein a position of the inner surface is included within an extent of the first restriction portion, in the direction of the axis of rotation.

2. The armrest device according to claim 1, further comprising a washer provided between the armrest frame and the support member, the washer contacting the inner surface and the support member.

3. The armrest device according to claim 2, wherein the first restriction portion has a surface protruding outward in a width direction of a seat further than the washer.

4. The armrest device according to claim 1, wherein the armrest frame includes a main frame and a reinforcing frame having a thickness greater than a thickness of the main frame, the reinforcing frame being so located as to lie over a portion of the main frame closer to the base end.

5. The armrest device according to claim 1, wherein the armrest frame includes a second protruding portion provided protrusively toward the support member,
wherein the armrest frame comprises:
a main frame; and
a reinforcing frame so located as to lie over a portion of the main frame closer to the base end on a side of the main frame opposite to another side of the main frame on which the support member is located, the reinforcing frame having a thickness greater than a thickness of the main frame, and
wherein the second protruding portion is provided in the reinforcing frame, extending through a through hole formed in the main frame to a side of the main frame on which the support member is located.

6. The armrest device according to claim 1, further comprising a tubular shaft rotatable relative to the support member,
wherein the inner surface has an approximately circular shape with a diameter larger than an inner diameter of the shaft.

7. The armrest device according to claim 6, wherein the support member comprises a tubular flange portion protruding in a direction along the axis of rotation,
wherein the inner surface has an approximately circular shape with a diameter larger than an inner diameter of the flange portion.

8. The armrest device according to claim 1, further comprising:
a shaft rotatable relative to the support member,
wherein the armrest frame comprises:
a main frame; and
a reinforcing frame fixed to the shaft, the reinforcing frame being so provided as to lie over the main frame in contact with the main frame, and
wherein the reinforcing frame includes a portion at which the reinforcing frame and the main frame face toward each other in the direction of the axis of rotation and part of which is separate from the main frame.

9. The armrest device according to claim 8, wherein a distance between the part of the reinforcing frame and the main frame is greater than a thickness of the reinforcing frame.

10. The armrest device according to claim 8, wherein a distance between the part of the reinforcing frame and the main frame is greater than a sum of a thickness of the main frame and a thickness of the reinforcing frame.

11. The armrest device according to claim 8,
wherein the reinforcing frame includes an insertion hole through which a bolt for fastening the reinforcing frame to the shaft is disposed,
wherein the reinforcing frame further includes a flange portion provided at a circumferential edge of the insertion hole protrusively in a direction along the axis of rotation, and
wherein a distal end of the flange portion is in contact with the main frame.

12. The armrest device according to claim 8, wherein a distance between the part of the reinforcing frame and the main frame is greater than a thickness of the main frame.

13. The armrest device according to claim 8, further comprising a spacer disposed between the part of the reinforcing frame and the main frame.

14. The armrest device according to claim 13, wherein the reinforcing frame has an engageable hole in which a projection provided at an end of the shaft is engageable, and
wherein the spacer has a receptacle hole or receptacle recess that receives the projection.

15. The armrest device according to claim 13, wherein the spacer has a through hole through which a bolt for fastening the reinforcing frame to the shaft is disposed.

16. The armrest device according to claim 13, wherein the spacer comprises plastic or rubber.

17. An armrest device comprising:
an armrest frame; and
a support member by which the armrest frame is rotatably supported,
wherein the armrest frame has, at lengthwise extremities thereof, a base end closer to an axis of rotation and a distal end farther from the axis of rotation,
wherein at least one member selected from the group consisting of the armrest frame and the support member includes a first restriction portion provided protrusively toward another of the armrest frame and the support member, the first restriction portion being a portion at which the armrest frame and the support member face toward each other in a direction of the axis of rotation of the armrest frame and which is located on one side of the axis of rotation on which the base end is located, when an armrest is in a use position,
wherein the armrest frame includes a main frame and a reinforcing frame having a thickness greater than a thickness of the main frame, the reinforcing frame being so located as to lie over a portion of the main frame closer to the base end, and
wherein the reinforcing frame is located on a side of the main frame opposite to another side of the main frame on which the support member is located.

18. The armrest device according to claim 17, wherein the main frame comprises:
a first base portion;
a first sidewall portion extending from an end of the first base portion closer to the base end on a side of the first base portion opposite to another side of the first base portion on which the support member is located; and
a first folded portion extending from an end of the first sidewall portion and having a distal end portion thereof folded toward the first base portion,
wherein the reinforcing frame comprises:
a second base portion so provided as to lie over the first base portion;
a second sidewall portion extending from an end of the second base portion closer to the base end on a side of the second base portion opposite to another side of the second base portion on which the support member is located, the second sidewall portion being so provided as to lie over the first sidewall portion; and
a second folded portion extending from an end of the second sidewall portion and having a distal end portion thereof folded toward the second base portion, the second folded portion being so provided as to lie over the first folded portion, and
wherein the reinforcing frame and the main frame are joined together at overlying portions of the first folded portion and the second folded portion.

19. The armrest device according to claim 18, wherein the distal end portions of the first folded portion and the second folded portion are located with a gap left between each of the distal end portions and the second sidewall portion.

* * * * *